United States Patent [19]

Yamazaki

[11] Patent Number: 5,068,904

[45] Date of Patent: Nov. 26, 1991

[54] IMAGE MEMORY CIRCUIT FOR USE IN A ROTATION OF IMAGE DATA

[75] Inventor: Hitoshi Yamazaki, Oume, Japan

[73] Assignees: Casio Electronics Manufacturing; Casio Computer Co. Ltd., both of Tokyo, Japan

[21] Appl. No.: 590,532

[22] Filed: Sep. 28, 1990

Related U.S. Application Data

[63] Continuation of Ser. No. 348,136, May 5, 1989, abandoned, which is a continuation of Ser. No. 41,871, Apr. 21, 1987, abandoned.

[30] Foreign Application Priority Data

Apr. 23, 1986 [JP] Japan .................................. 61-93588
Apr. 23, 1986 [JP] Japan .................................. 61-93589
Apr. 23, 1986 [JP] Japan .................................. 61-93590

[51] Int. Cl.$^5$ ............................................. G06K 9/32
[52] U.S. Cl. ..................................... 382/46; 365/232; 382/41; 382/44
[58] Field of Search .................. 382/41, 44, 46, 49; 364/521, 139; 340/727, 799; 365/232

[56] References Cited

U.S. PATENT DOCUMENTS

| | | | |
|---|---|---|---|
| 3,811,110 | 5/1974 | Inose et al. | 382/46 |
| 4,168,488 | 9/1979 | Evans | 382/46 |
| 4,578,812 | 5/1986 | Yui | 382/41 |
| 4,627,020 | 12/1986 | Anderson et al. | 382/46 |
| 4,631,750 | 12/1986 | Gabriel et al. | 382/41 |
| 4,635,292 | 1/1987 | Mori et al. | 382/41 |
| 4,661,987 | 4/1987 | Anderson et al. | 382/41 |
| 4,692,944 | 9/1988 | Masuzaki et al. | 382/41 |
| 4,710,965 | 12/1987 | Kobayashi | 382/41 |
| 4,736,442 | 4/1988 | Kornfeld | 382/46 |
| 4,797,852 | 1/1989 | Nanda | 382/46 |
| 4,805,117 | 2/1989 | Fiore et al. | 382/46 |

FOREIGN PATENT DOCUMENTS

| | | |
|---|---|---|
| 61-9081 | 1/1986 | Japan . |
| 61-6393 | 2/1986 | Japan . |
| 61-54529 | 3/1986 | Japan . |
| 61-63891 | 4/1986 | Japan . |
| 61-67367 | 4/1986 | Japan . |

*Primary Examiner*—David K. Moore
*Assistant Examiner*—Joseph Mancuso
*Attorney, Agent, or Firm*—Sandler, Greenblum & Bernstein

[57] ABSTRACT

A memory circuit receives (n × n) data dots of an image data and stores a plurality of data dots selected from the image of data in a single address. Before the plurality of data dots are stored in the single memory, they are shifted in a transverse row direction by one bit with regard to each of the rows and are shifted in a vertical column direction by one bit with regard to each of the columns. The image data is rotated in a step-like manner by 90° clockwise or anticlockwise. The image data is rotationally shifted during write/read times, and the address in which the data dots are stored is decoded in units of data dots.

6 Claims, 16 Drawing Sheets

| YINV | XINV | WS | H/V | R/W=1 ROTATION DURING READ | R/W=0 ROTATION DURING WRITE |
|---|---|---|---|---|---|
| 0 | 0 | 0 | 0 | BASIC IMAGE NOT TURNED | BASIC IMAGE NOT TURNED |
| 1 | 0 | 0 | 0 | UP-SIDE-DOWN AND BACK-TO-FRONT | UP SIDE DOWN AND BACK-TO-FRONT |
| 0 | 1 | 0 | 0 | — | — |
| 1 | 1 | 0 | 0 | — | — |
| 0 | 0 | 1 | 0 | — | — |
| 1 | 0 | 1 | 0 | — | — |
| 0 | 1 | 1 | 0 | REVERSED FROM LEFT TO RIGHT AND VICE VERSA AND BACK-TO-FRONT | REVERSED FROM LEFT TO RIGHT AND VICE VERSA AND BACK-TO-FRONT |
| 1 | 1 | 1 | 0 | ROTATED BY 180° | ROTATED BY 180° |
| 0 | 0 | 0 | 1 | ROTATED BY 90° CLOCKWISE | ROTATED BY 90° ANTI CLOCKWISE |
| 1 | 0 | 0 | 1 | UP-SIDE-DOWN, BACK-TO-FRONT AND ROTATED BY 90° CLOCKWISE | UP-SIDE-DOWN, BACK-TO-FRONT AND ROTATED BY 90° ANTI CLOCKWISE |
| 0 | 1 | 0 | 1 | — | — |
| 1 | 1 | 0 | 1 | — | — |
| 0 | 0 | 1 | 1 | — | — |
| 1 | 0 | 1 | 1 | — | — |
| 0 | 1 | 1 | 1 | REVERSED FROM LEFT TO RIGHT, BACK-TO-FRONT, ROTATED BY 90° CLOCKWISE | REVERSED FROM LEFT TO RIGHT, BACK-TO-FRONT, ROTATED BY 90° ANTI CLOCKWISE |
| 1 | 1 | 1 | 1 | ROTATED BY 270° CLOCKWISE | ROTATED BY 270° ANTI CLOCKWISE |

X COORDINATE OF BASIC IMAGE (XK) →

| | 00 | 01 | 02 | | 0E | 0F | 10 | | FC | FD | FE | FF |
|---|---|---|---|---|---|---|---|---|---|---|---|---|
| 00 | 0000 D15 | 0000 D14 | 0000 D13 | ----- | 0000 D1 | 0000 D0 | 0001 D15 | --- | 000F D3 | 000F D2 | 000F D1 | 000F D0 |
| 01 | 0100 D0 | 0100 D15 | 0100 D14 | | 0100 D2 | 0100 D1 | 0101 D0 | | 010F D4 | 010F D3 | 010F D2 | 010F D1 |
| 02 | 0200 D1 | 0200 D0 | 0200 D15 | | 0200 D3 | 0200 D2 | 0201 D1 | --- | 020F D5 | 020F D4 | 020F D3 | 020F D2 |
| ⋮ | ⋮ | | | | | | | | | | | |
| 0F | 0F00 D14 | 0F00 D13 | 0F00 D12 | | 0F00 D0 | 0F00 D15 | 0F01 D14 | | 0F0F D2 | 0F0F D1 | 0F0F D0 | 0F0F D15 |
| 10 | 1000 D15 | 1000 D14 | 1000 D13 | | 1000 D1 | 1000 D0 | 1001 D15 | | 100F D3 | 100F D2 | 100F D1 | 100F D0 |
| ⋮ | | | | | | | | | | | | |
| FB | FB00 D10 | FB00 D9 | FB00 D8 | | FB00 D12 | FB00 D11 | | --- | FB0F D14 | FB0F D13 | FB0F D12 | FB0F D11 |
| FC | FC00 D11 | FC00 D10 | FC00 D9 | | FC00 D13 | FC00 D12 | | | FC0F D15 | FC0F D14 | FC0F D13 | FC0F D12 |
| FD | FD00 D12 | FD00 D11 | FD00 D10 | | FD00 D14 | FD00 D13 | | | FD0F D0 | FD0F D15 | FD0F D14 | FD0F D13 |
| FE | FE00 D13 | FE00 D12 | FE00 D11 | | FE00 D15 | FE00 D14 | | | FE0F D1 | FE0F D0 | FE0F D15 | FE0F D14 |
| FF | FF00 D14 | FF00 D13 | FF00 D12 | ----- | FF00 D0 | FF00 D15 | | | FF0F D2 | FF0F D1 | FF0F D0 | FF0F D15 |

Y COORDINATE OF BASIC IMAGE (YK) ↓

| INPUT YB3~0 / OUTPUT | 0000 | 0001 | 0010 | 0011 | 0100 | 0101 | 0110 | 0111 | 1000 | 1001 | 1010 | 1011 | 1100 | 1101 | 1110 | 1111 |
|---|---|---|---|---|---|---|---|---|---|---|---|---|---|---|---|---|
| QF3~0 | 0000 | 0001 | 0010 | 0011 | 0100 | 0101 | 0110 | 0111 | 1000 | 1001 | 1010 | 1011 | 1100 | 1101 | 1110 | 1111 |
| QE3~0 | 0000 | 0001 | 0010 | 0011 | 0100 | 0101 | 0110 | 0111 | 1000 | 1001 | 1010 | 1011 | 1100 | 1101 | 1110 | 1111 |
| QD3~0 | 0000 | 0001 | 0010 | 0011 | 0100 | 0101 | 0110 | 0111 | 1000 | 1001 | 1010 | 1011 | 1100 | 1101 | 1110 | 1111 |
| QC3~0 | 0000 | 0001 | 0010 | 0011 | 0100 | 0101 | 0110 | 0111 | 1000 | 1001 | 1010 | 1011 | 1100 | 1101 | 1110 | 1111 |
| QB3~0 | 0000 | 0001 | 0010 | 0011 | 0100 | 0101 | 0110 | 0111 | 1000 | 1001 | 1010 | 1011 | 1100 | 1101 | 1110 | 1111 |
| QA3~0 | 0000 | 0001 | 0010 | 0011 | 0100 | 0101 | 0110 | 0111 | 1000 | 1001 | 1010 | 1011 | 1100 | 1101 | 1110 | 1111 |
| Q93~0 | 0000 | 0001 | 0010 | 0011 | 0100 | 0101 | 0110 | 0111 | 1000 | 1001 | 1010 | 1011 | 1100 | 1101 | 1110 | 1111 |
| Q83~0 | 0000 | 0001 | 0010 | 0011 | 0100 | 0101 | 0110 | 0111 | 1000 | 1001 | 1010 | 1011 | 1100 | 1101 | 1110 | 1111 |
| Q73~0 | 0000 | 0001 | 0010 | 0011 | 0100 | 0101 | 0110 | 0111 | 1000 | 1001 | 1010 | 1011 | 1100 | 1101 | 1110 | 1111 |
| Q63~0 | 0000 | 0001 | 0010 | 0011 | 0100 | 0101 | 0110 | 0111 | 1000 | 1001 | 1010 | 1011 | 1100 | 1101 | 1110 | 1111 |
| Q53~0 | 0000 | 0001 | 0010 | 0011 | 0100 | 0101 | 0110 | 0111 | 1000 | 1001 | 1010 | 1011 | 1100 | 1101 | 1110 | 1111 |
| Q43~0 | 0000 | 0001 | 0010 | 0011 | 0100 | 0101 | 0110 | 0111 | 1000 | 1001 | 1010 | 1011 | 1100 | 1101 | 1110 | 1111 |
| Q33~0 | 0000 | 0001 | 0010 | 0011 | 0100 | 0101 | 0110 | 0111 | 1000 | 1001 | 1010 | 1011 | 1100 | 1101 | 1110 | 1111 |
| Q23~0 | 0000 | 0001 | 0010 | 0011 | 0100 | 0101 | 0110 | 0111 | 1000 | 1001 | 1010 | 1011 | 1100 | 1101 | 1110 | 1111 |
| Q13~0 | 0000 | 0001 | 0010 | 0011 | 0100 | 0101 | 0110 | 0111 | 1000 | 1001 | 1010 | 1011 | 1100 | 1101 | 1110 | 1111 |
| Q03~0 | 0000 | 0001 | 0010 | 0011 | 0100 | 0101 | 0110 | 0111 | 1000 | 1001 | 1010 | 1011 | 1100 | 1101 | 1110 | 1111 |

| INPUT YB3~0 / OUTPUT | 0000 | 0001 | 0010 | 0011 | 0100 | 0101 | 0110 | 0111 | 1000 | 1001 | 1010 | 1011 | 1100 | 1101 | 1110 | 1111 |
|---|---|---|---|---|---|---|---|---|---|---|---|---|---|---|---|---|
| QF3~0 | 1111 | 1110 | 1101 | 1100 | 1011 | 1010 | 1001 | 1000 | 0111 | 0110 | 0101 | 0100 | 0011 | 0010 | 0001 | 0000 |
| QE3~0 | 1110 | 1101 | 1100 | 1011 | 1010 | 1001 | 1000 | 0111 | 0110 | 0101 | 0100 | 0011 | 0010 | 0001 | 0000 | 1111 |
| QD3~0 | 1101 | 1100 | 1011 | 1010 | 1001 | 1000 | 0111 | 0110 | 0101 | 0100 | 0011 | 0010 | 0001 | 0000 | 1111 | 1110 |
| QC3~0 | 1100 | 1011 | 1010 | 1001 | 1000 | 0111 | 0110 | 0101 | 0100 | 0011 | 0010 | 0001 | 0000 | 1111 | 1110 | 1101 |
| QB3~0 | 1011 | 1010 | 1001 | 1000 | 0111 | 0110 | 0101 | 0100 | 0011 | 0010 | 0001 | 0000 | 1111 | 1110 | 1101 | 1100 |
| QA3~0 | 1010 | 1001 | 1000 | 0111 | 0110 | 0101 | 0100 | 0011 | 0010 | 0001 | 0000 | 1111 | 1110 | 1101 | 1100 | 1011 |
| Q93~0 | 1001 | 1000 | 0111 | 0110 | 0101 | 0100 | 0011 | 0010 | 0001 | 0000 | 1111 | 1110 | 1101 | 1100 | 1011 | 1010 |
| Q83~0 | 1000 | 0111 | 0110 | 0101 | 0100 | 0011 | 0010 | 0001 | 0000 | 1111 | 1110 | 1101 | 1100 | 1011 | 1010 | 1001 |
| Q73~0 | 0111 | 0110 | 0101 | 0100 | 0011 | 0010 | 0001 | 0000 | 1111 | 1110 | 1101 | 1100 | 1011 | 1010 | 1001 | 1000 |
| Q63~0 | 0110 | 0101 | 0100 | 0011 | 0010 | 0001 | 0000 | 1111 | 1110 | 1101 | 1100 | 1011 | 1010 | 1001 | 1000 | 0111 |
| Q53~0 | 0101 | 0100 | 0011 | 0010 | 0001 | 0000 | 1111 | 1110 | 1101 | 1100 | 1011 | 1010 | 1001 | 1000 | 0111 | 0110 |
| Q43~0 | 0100 | 0011 | 0010 | 0001 | 0000 | 1111 | 1110 | 1101 | 1100 | 1011 | 1010 | 1001 | 1000 | 0111 | 0110 | 0101 |
| Q33~0 | 0011 | 0010 | 0001 | 0000 | 1111 | 1110 | 1101 | 1100 | 1011 | 1010 | 1001 | 1000 | 0111 | 0110 | 0101 | 0100 |
| Q23~0 | 0010 | 0001 | 0000 | 1111 | 1110 | 1101 | 1100 | 1011 | 1010 | 1001 | 1000 | 0111 | 0110 | 0101 | 0100 | 0011 |
| Q13~0 | 0001 | 0000 | 1111 | 1110 | 1101 | 1100 | 1011 | 1010 | 1001 | 1000 | 0111 | 0110 | 0101 | 0100 | 0011 | 0010 |
| Q03~0 | 0000 | 1111 | 1110 | 1101 | 1100 | 1011 | 1010 | 1001 | 1000 | 0111 | 0110 | 0101 | 0100 | 0011 | 0010 | 0001 |

X COORDINATE OF BASIC IMAGE (XK) →

| YK \ XK | 00 | 01 | 02 | ... | 0E | 0F | 10 | | FC | FD | FE | FF |
|---|---|---|---|---|---|---|---|---|---|---|---|---|
| 00 | DB15 | DB14 | DB13 | ----- | DB1 | DB0 | DB15 | | DB3 | DB2 | DB1 | DB0 |
| 01 | DB15 | DB14 | DB13 | | DB1 | DB0 | DB15 | | DB3 | DB2 | DB1 | DB0 |
| 02 | DB15 | DB14 | DB13 | | DB1 | DB0 | DB15 | | DB3 | DB2 | DB1 | DB0 |
| ... | | | | | | | | | | | | |
| 0F | DB15 | DB14 | DB13 | | DB1 | DB0 | DB15 | | DB3 | DB2 | DB1 | DB0 |
| 10 | DB15 | DB14 | DB13 | | DB1 | DB0 | DB15 | | DB3 | DB2 | DB1 | DB0 |
| ... | | | | | | | | | | | | |
| FB | DB15 | DB14 | DB13 | | DB1 | DB0 | DB15 | | DB3 | DB2 | DB1 | DB0 |
| FC | DB15 | DB14 | DB13 | | DB1 | DB0 | DB15 | | DB3 | DB2 | DB1 | DB0 |
| FD | DB15 | DB14 | DB13 | | DB1 | DB0 | DB15 | | DB3 | DB2 | DB1 | DB0 |
| FE | DB15 | DB14 | DB13 | | DB1 | DB0 | DB15 | | DB3 | DB2 | DB1 | DB0 |
| FF | DB15 | DB14 | DB13 | ---- | DB1 | DB0 | DB15 | | DB3 | DB2 | DB1 | DB0 |

Y COORDINATE OF BASIC IMAGE (YK) ↓

Fig. 5

| YINV | XINV | WS | H/V | R/W = 1 ROTATION DURING READ | R/W = 0 ROTATION DURING WRITE |
|---|---|---|---|---|---|
| 0 | 0 | 0 | 0 | BASIC IMAGE NOT TURNED | BASIC IMAGE NOT TURNED |
| 1 | 0 | 0 | 0 | UP-SIDE-DOWN AND BACK-TO-FRONT | UP SIDE DOWN AND BACK-TO-FRONT |
| 0 | 1 | 0 | 0 | — | — |
| 1 | 1 | 0 | 0 | — | — |
| 0 | 0 | 1 | 0 | — | — |
| 1 | 0 | 1 | 0 | — | — |
| 0 | 1 | 1 | 0 | REVERSED FROM LEFT TO RIGHT AND VICE VERSA AND BACK-TO-FRONT | REVERSED FROM LEFT TO RIGHT AND VICE VERSA AND BACK-TO-FRONT |
| 1 | 1 | 1 | 0 | ROTATED BY 180° | ROTATED BY 180° |
| 0 | 0 | 0 | 1 | ROTATED BY 90° CLOCKWISE | ROTATED BY 90° ANTI CLOCKWISE |
| 1 | 0 | 0 | 1 | UP-SIDE-DOWN, BACK-TO-FRONT AND ROTATED BY 90° CLOCKWISE | UP-SIDE-DOWN, BACK-TO-FRONT AND ROTATED BY 90° ANTI CLOCKWISE |
| 0 | 1 | 0 | 1 | — | — |
| 1 | 1 | 0 | 1 | — | — |
| 0 | 0 | 1 | 1 | — | — |
| 1 | 0 | 1 | 1 | — | — |
| 0 | 1 | 1 | 1 | REVERSED FROM LEFT TO RIGHT, BACK-TO-FRONT, ROTATED BY 90° CLOCKWISE | REVERSED FROM LEFT TO RIGHT, BACK-TO-FRONT, ROTATED BY 90° ANTI CLOCKWISE |
| 1 | 1 | 1 | 1 | ROTATED BY 270° CLOCKWISE | ROTATED BY 270° ANTI CLOCKWISE |

Fig. 7

| FDIR1 | FDIR0 | ADDRESS VALUES Y7~Y4 | ADDRESS VALUES X3~X0 |
|---|---|---|---|
| 0 | 0 | YA7~YA4 | XA7~XA4 |
| 0 | 1 | XA7~XA4 | $\overline{YA7}$~$\overline{YA4}$ |
| 1 | 0 | $\overline{YA7}$~$\overline{YA4}$ | $\overline{XA7}$~$\overline{XA4}$ |
| 1 | 1 | $\overline{XA7}$~$\overline{XA4}$ | YA7~YA4 |

Fig. 9

IMAGE DATA
NOT TURNED

IMAGE DATA ROTATED
BY 90° CLOCKWISE

IMAGE DATA ROTATED
BY 270° CLOCKWISE

IMAGE DATA ROTATED
BY 180° CLOCKWISE

| 0 | 1 | 2 | 3 | 4 | 5 | 6 | 7 | 8 |
|---|---|---|---|---|---|---|---|---|
| 9 | A | B | C | D | E | F | 10 | 11 |
|   |   |   |   |   |   |   |   |   |
|   |   |   |   |   |   |   |   |   |
|   |   |   |   |   |   |   |   |   |
|   |   |   |   |   |   |   |   |   |
|   |   |   |   |   |   |   |   |   |
|   |   |   |   |   |   |   |   |   |
|   |   |   |   |   |   |   |   |   |
|   |   |   |   |   |   |   |   |   |
|   |   |   |   |   |   |   |   |   |
| 6C | 6D | 6E | 6F | 70 | 71 | 72 | 73 | 74 |
| 75 | 76 | 77 | 78 | 79 | 7A | 7B | 7C | 7D |
| 7E | 7F |   |   |   |   |   |   |   |

RESIDUAL

Fig. 12

| FDIR1 | FDIR0 | SELECTOR SL7 OUTPUT (BB7~BB4) | SELECTOR SL8 OUTPUT (BB3~BB0) |
|---|---|---|---|
| 0 | 0 | YA11~YA8 | XA11~XA8 |
| 0 | 1 | XA11~XA8 | (XB3~XB0)-(YA11~YA8) |
| 1 | 0 | (YB3~YB0)-(YA11~YA8) | (XB3~XB0)-(XA11~XA8) |
| 1 | 1 | (YB3~YB0)-(XA11~XA8) | YA11~YA8 |

Fig. 13

IMAGE MEMORY CIRCUIT FOR USE IN A ROTATION OF IMAGE DATA

This application is a continuation of application Ser. No. 07/348,136, filed May 5, 1990, which is a continuation of Ser. No. 07/041,871 filed Apr. 21, 1987 both now abandoned.

BACKGROUND OF THE INVENTION a) Field of the Invention

The present invention relates to a memory and more particularly, it relates to an image memory for storing image data which is used in e.g., liquid crystal printer and/or displays.

b) Discussion of Background Information

The progress of microprocessors has made it possible to process image data in a complex manner; for example, graphic patterns obtained by the microprocessors can be rotated and displayed as rotated images.

The image data for the graphic patterns comprises a plurality of bits, each bit representing one dot as either white or black as indicated by "0" or "1"; and a plurality of dots are stored as a unit in the memory. When the graphic patterns have colors and tones, plural bits are allotted to one dot. FIG. 1 shows an arrangement of a memory for storing image data (256 dots×256 dots). One address comprises one word (16 bits) and 16 dots in the horizontal or transverse direction of an image (i.e., the X-direction image), and a dot in the vertical or longitudinal direction thereof (i.e., the Y-direction image); the group of 16 dots is stored as one word to represent a corresponding position of the image. The image is separated at the 16th dot as viewed when counting from the upper left dot rightwardly, and the data of these 16 dots (or 16 bits) is stored in an image address "000H"; and data relating to the next 16 dots located to the right is stored in an image address XG "001H". Since there are 256 dots in the horizontal direction, 16 addresses (the less significant bits of the addresses are 4 bits) correspond to one line or row. Each dot in the Y direction, i.e., of image addresses (YG), represents one row; and these dots are stored as "000H", "010H", ... (wherein "H" represents a hexadecimal system).

When the data stored in the memory is to be read in a conventional manner, the addresses 000,001, ... 010, 011, ... are read out in this order, so that the image data representing a graphic pattern at its right or unturned position (when the graphic pattern is not rotated) can be obtained.

In order to obtain image data which represent the graphic pattern, i.e., which are turned 90° clockwise from the position where the data is firstly displayed on the display screen for example, bits which correspond to one lower left dot are read out so that they are located in the upper left position. More specifically, if MSB (B15) of 16 bits corresponds to the left side of a display screen, 16 words of addresses FF0-F00 are successively read out, a bit 15 (B15) of each of the 16 words is designated to represent one word, and this one word thus obtained is taken for one word (address 000) at the upper left of the display screen. 16 words of addresses EF0-E00 are then read out, and a bit 15 (B15) of each of the 16 words is taken for one word and used as the next single word (address 001). After one column is thus read out, 16 words of the same addresses FF0-F00 are read out and a bit 14 (B14) of each of the 16 words is represented as one word. After 16 columns are read out, one word is similarly taken from a bit 15 of each of the 16 words of the addresses EF0-E00. The image data which has been turned clockwise by 90° can be thus obtained by this read-out of 16 words and selection of one bit.

In the above-described conventional case of obtaining image data turned by 90°, all of the data is read out in single word units, but only one bit of each of the words thus read out becomes effective as the data. In other words, 15 bits of the 16 bits read out become ineffective as data. When writing is to be carried out, the data of the 16 bits to be stored is divided and is all placed into a single bit, so that just one word which corresponds to an intended position for such bits in the memory will be read out; and thus the position of only one bit of the one word converted to a new position will be read, thereby causing the image data turned by 90° and to then be stored in a new position. In short, readout and write can be achieved in a form of 16 bits, but the process is carried out in the form of one bit, thereby taking a long time. Particularly, when writing is carried out, read-out is done at one time, and storing is then carried out, thereby causing the process to take a longer time than necessary.

In a case where direct access is successively made to the above-described memory in the horizontal direction in order to output video signals to the display unit such as a CRT, such access is achieved using a circuit that performs as described above. However, read-out speed in the horizontal direction is different from that in the vertical direction, and the manner of processing obtained words at every dot in the horizontal direction is also different from that in the vertical direction. I.e., the process is effected using registers of a parallel-in and serial-out type every time one word is read out in the horizontal direction; while an intended bit is selected and outputted every time one word is read out in the vertical direction, thereby making the circuit complicated.

Further, when the graphic pattern is rotated over less than the entire display screen, i.e., over only a part thereof, a more complicated process circuit is needed.

SUMMARY OF THE INVENTION

The present invention is intended to eliminate the above-mentioned drawbacks.

An object of the present invention is therefore to provide a dynamic memory driver circuit capable of simultaneously outputting intended plural dot data in order to provide access to a memory, in both horizontal and vertical directions.

Another object of the present invention is to provide a dynamic memory driver circuit capable of rotating larger images by means of a simple circuit.

A feature of the present invention is to provide a memory circuit for receiving image data of (n×n) dots, whose circuit comprises a plurality of image memory sections for storing a plurality of dots out of said image data in a single address by shifting, by one dot, at least one of a row in a horizontal direction and a column in a vertical direction in accordance with at least one of transverse row and longitudinal column directions of the image data; and further comprises a subtraction circuit for subtracting the image data address value designating the image memory section along a line from the maximum number of image memory sections along the line, thereby designating an image memory section.

A plurality of dots are obtained from an image data of (n×n) dots and are stored in a single address as a unit. The manner of storing the dots in the image memory is conducted by shifting the dots of the image data, at least in either a transverse row direction or in a longitudinal column direction successively by one dot, in accordance with at least one of the transverse row and longitudinal column directions of the image data. Therefore, the image data of (n×n) dots is accessed into a unit having a plurality of dots in a transverse and then in a longitudinal direction or vice versa. The image memory constitutes an image memory section, and a plurality of image memory sections comprises one image. An image address value designating a particular image memory section in a line of the image memory sections is subtracted from the maximum number of image memory sections forming the one line of the image memory, thereby providing an image address value of the image memory when the one line of the image memory comprising a plurality of the image memory sections is accessed in a reverse direction.

BRIEF DESCRIPTION OF THE DRAWING

FIG. 2 is a memory location diagram of the present invention;

FIGS. 4A and 4B represent the input and output data tables, respectively, of an address decoder used in the present invention FIG. 5 is a memory location diagram at the time of access;

FIG. 7 is a table showing the relative positions of an image obtained at the read and write times;

FIG. 9 is a table showing the relation between rotation control signals and address values in the embodiment of FIG. 8;

FIG. 12 is an example of block numbers allotted when an image of B4 size is to be displayed in the embodiment of FIG. 11; and FIG. 13 is a table showing rotation control signals and address values applied to the memory in the embodiment of FIG. 11.

DETAILED DESCRIPTION OF THE PREFERRED EMBODIMENT

Figure 1:
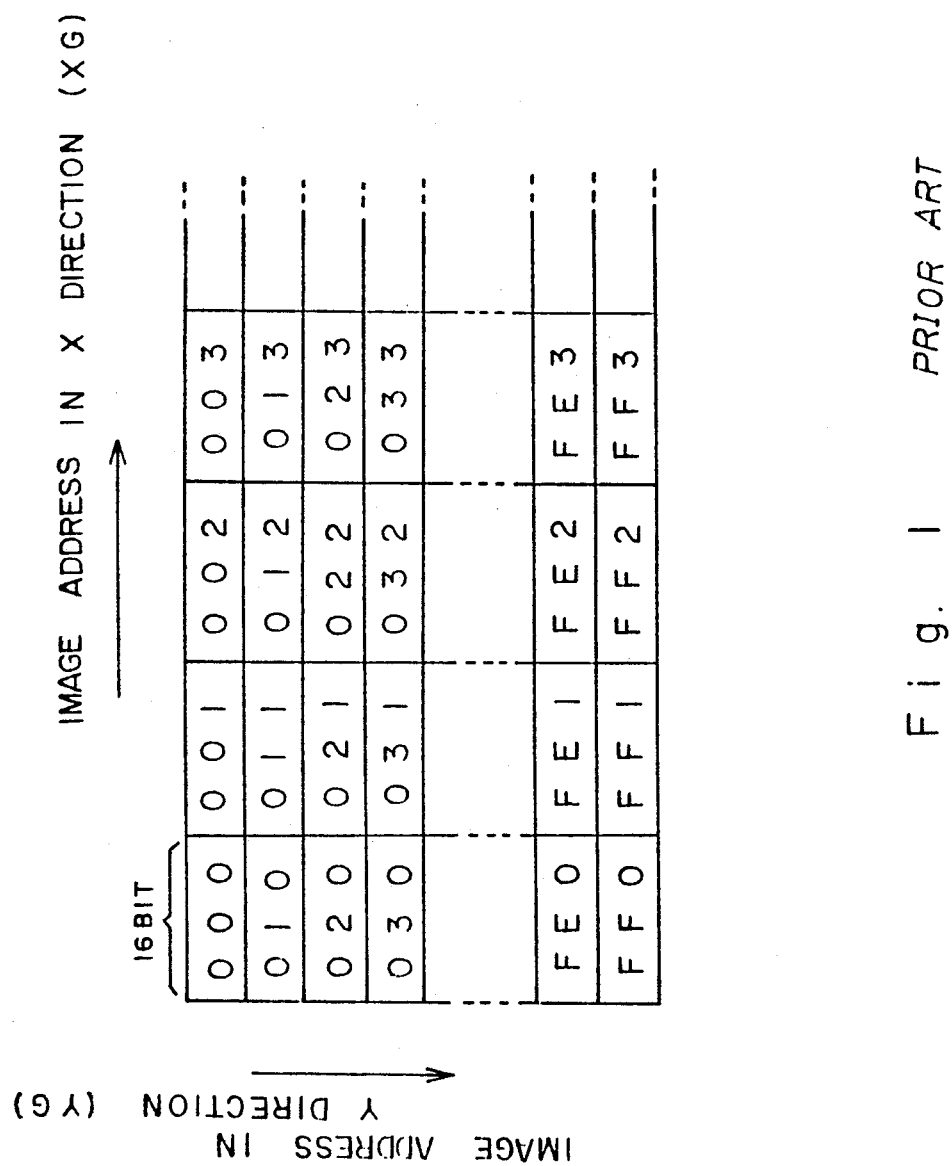
FIG. 1 is a diagram representing how data are stored in a conventional memory.

The present invention will be described in detail with reference to the attached drawings.

An arrangement of a memory having (n×n) dots and an image memory to which access can be attained from horizontal and vertical, left and right and up and down directions, by means of the memory driver circuit, will now be described.

FIG. 2 shows a memory arrangement of the present invention. The upper bits which correspond to each of the dots are placed in a small frame and represent the memory addresses, while the lower bits in each small frame denote a bit position of the memory address. When the Y coordinate (YK) of a basic image is "00" and the X coordinate (XK) is also "00", a bit 15 (D15) is allotted to an address Add "0000" of the memory. Every 16-address (FH wherein H represents a hexadecimal notation) is successively moved forward, step by step within a unit of 16 bits, in the X coordinate (XK) direction, and those dots in each single address are allotted to bits 15–0(D15–D0). When the Y coordinate (YK) of the basic image is "01", bit 0 (D0) of an address "0100" and its right side bits 15-1 (D15–D1) are each shifted by one dot, and every time addresses in the Y coordinate (YK) of the basic image are moved forward, step by step, every 16-bit is horizontally shifted by one dot to the right.

In other words, when the Y coordinate (YK) of the basic image is "00", the address "0000" has bits 15–0(D15–D0), the address "0001" has bits 15–0(D15–D0) and the address "0002" has bits 15–0 (D15–D0), etc. When the Y coordinate (YK) is "01", the address "0100" has bit 0(D0) and then bits 15-1(D15–D1), the address "0101" has bit 0(D0) and then bits 15-1(D15–D1), and the address "0102" has bit 0 (D0) and then bits 15-1 (D15–D1), etc. when the Y coordinate (YK) is "02", the address ADD "0200" has bits 1, 0(i.e., D1–D0)and then bits 15-2 (D15–D2), the address ADD "0201" has bits 1, 0 and then bits 15-2 (D15–D2), etc. Since the Y coordinate of the basic image is increasingly operated in a step-by-step fashion, every 16-bit unit is shifted horizontally to the right and, thus, every 16-bit unit is turn-shifted or rotated.

Because of the above-described allotments of the memory arrangement, the locations of the bit values (D15–D0) of the 16 bit unit become different at the time as when the basic image is read out in the form of every 16-bit in the horizontal or vertical directions thereof. Access can thus be attained in units of 16 bits in either the horizontal or vertical directions. Any access in the horizontal direction is obtained using the same address, while access in the vertical direction is made to a different memory address with regard to each bit.

According to the present invention, the image data in a row is divided into units of a plurality of dots, for example 16 dots, and the divided data is stored in the single address of the memory. A plurality of sequentially divided dots is stored in the memory in correspondence with the bits of the memory. Especially, the present invention is featured by a memory construction, divided image data and above mentioned plurality of dots and the mutual relationship between them is different from the prior art. The memory comprises a plurality of memory parts each having an input and output terminal for a single bit and an independent address terminal. The relationship between the divided dots and the bit position for memorizing a plurality of dots is such that the data is rotationally shifted within the divided data by one bit and is stored in the same address as the plurality of memories. In the case of reading or storing the data in the transverse direction, the respective dot units are stored or read out in the same address by the plurality of memories. On the other hand, in the case of storing or reading the data in the longitudinal direction, it becomes useful that the plurality of memories have respective input and output terminals of one bit and several address terminals.

If the stored data is read out in the longitudinal direction, the address of the respective stored dots are different and the addresses added to the respective memories should be converted. This conversion permits a simultaneous read out of the data in the vertical direction. Upon writing the data in the transverse direction, the data is stored in a manner of rotational shift and thus the stored data is also rotationally shifted. This rotational shift is carried out corresponding to the bit position during a reading operation in the vertical direction. Thus, by amending the rotation shift to the original status, the reading of the data in the vertical direction is now possible.

Figure 3A:
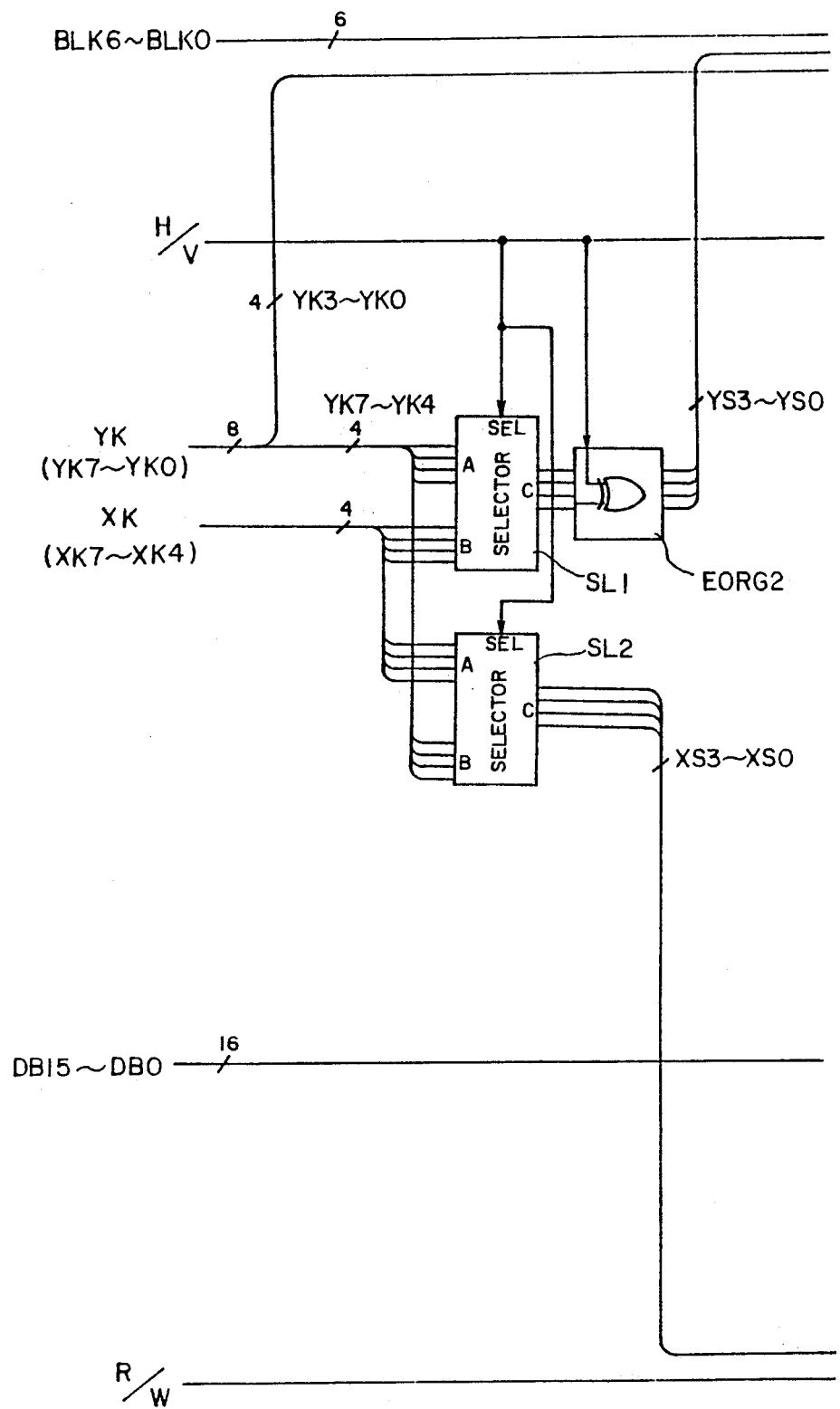
FIGS. 3A and 3B are a circuit arrangement showing a first embodiment of the present invention.
Figure 3B:
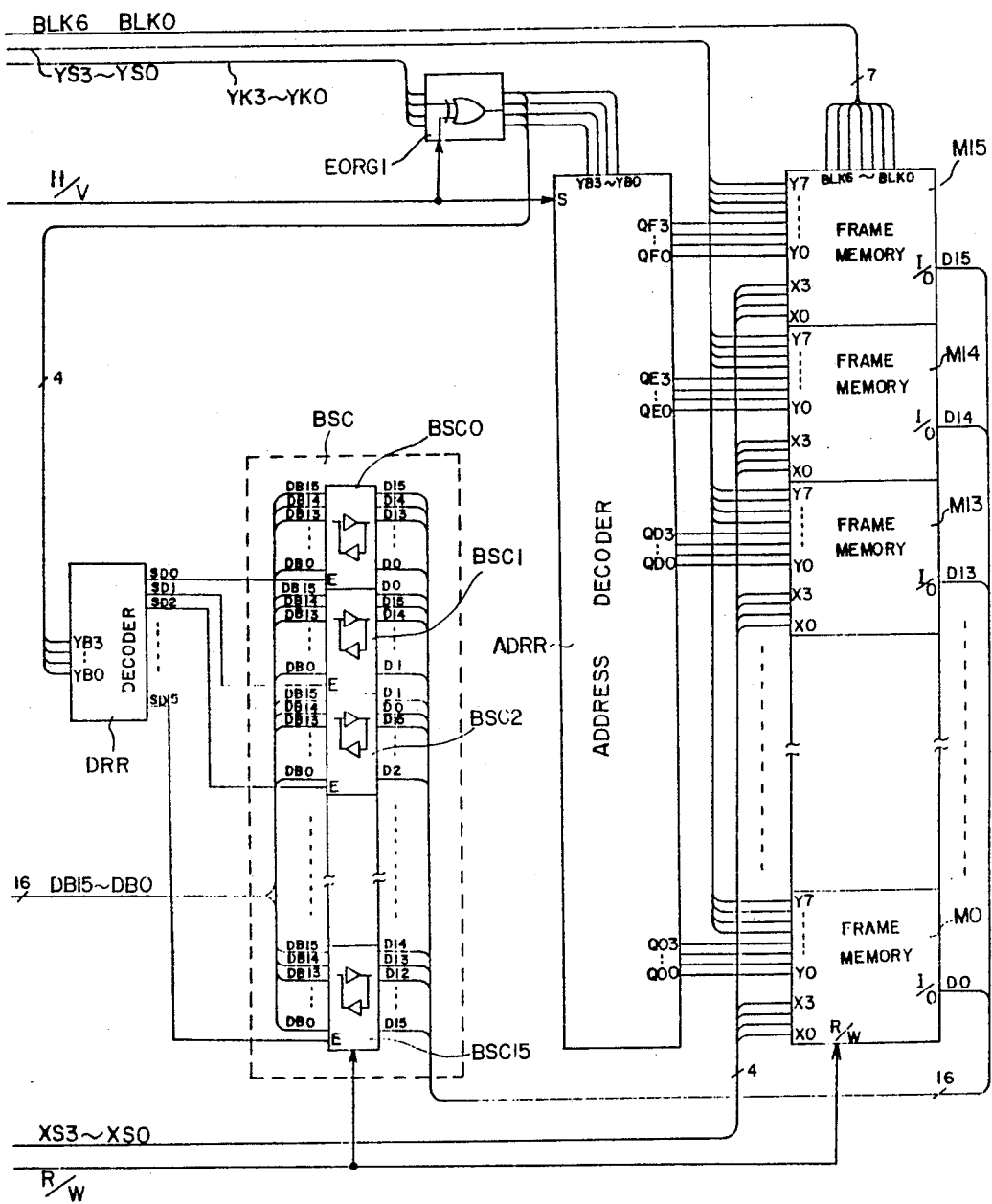

FIGS. 3A and 3B are a circuit arrangement showing a first embodiment of the present invention; Each of the frame memories (M15-M0) has an input/output terminal I/O for one bit, and the memories together form a memory for inputting and outputting data of the 16 bits (D15-D0). Numerals to which oblique lines are attached on lines in FIG. 2 represent the number of bits. Each of the frame memories M15-M0 has address input terminals through which address values (Y7-Y0, X3-X0) are applied, and block input terminals through which block values (BLK6-BLK0) are applied. The frame memories (M15-M0) have a capacity for storing plural images, and the block input terminals through which the block values (BLK6-BLK0) are applied are able to designate one of such images. Any intended blockage or paging of the image is instructed by the block values (BLK6-BLK0).

The upper 4 bits (YK7-YK4) on the Y coordinate (YK) of the basic image are applied to input terminal A of selector SL 1 and input terminal B of selector SL2, while the upper 4 bits (XK7-XK4) on the X coordinate (XK) thereof are applied to input terminal B of selector SL 1 and input terminal A of selector SL 2. The selectors SL 1 and SL 2 select data applied through their input terminals A and B, and deliver the selected data through their output terminals C; and, these selections are determined responsive to a horizontal/vertical changeover signal H/V applied through the selection terminals SEL. When the horizontal/vertical changeover signal H/V is at a low level of "0", the selectors SL 1 and SL 2 select data applied through the input terminals A and deliver the data through their output terminals C, while when the signal H/V is at a high level "1", they select data applied through their output terminals B and transmit the data through their output terminals C.

In the embodiment of the present invention, the address of the basic image comprises 8 bits (YK-YK0) in the Y direction and 4 bits (XK7-XK4) in the X direction.

The memory is constructed such that the image can be accessed in units of plurality of dots (16 dots). Thus, the lower bits in a transverse direction are not necessary and these lower bits correspond to the bit position of the data output.

The selectors SL1 and SL2 switch or swap the addresses to the memories in the longitudinal direction with those in the transverse direction. Where the addresses in the vertical direction are switched with those in the transverse direction, the increasing order of address input is reversed. An embodiment of the present invention, the upper left end of the basic image is set at an original point and the address values increase in the righthand direction or downward direction. However, the above recited selection switches the addresses in the transverse direction with those in the longitudinal direction to carry out a clockwise rotation of 90° for reading out the data, and the increasing order of the addresses is reversed. As the original point of the basic image is always set at the upper left end, this is corrected by the exclusive logic OR circuits ER01 and EOR2.

When the rotation of the image is not intended, the longitudinal addresses are commonly supplied to the frame memories M0-M15. When the rotation is intended, the addresses to be added to the respective frame memories should be changed. This operation is conducted by the address decoder ADRR. The details of the address decoder ADRR will be described hereinafter.

A description will first be provided concerning a situation in which the signal H/V is at a low level. The selector SL1 selects the upper 4 bits (YK7-YK4) of the Y coordinate (YK) of the basic image in this case, while selector SL2 selects the upper 4 bits (XK7-XK4) of the X coordinate (XK) thereof, and the selectors output the thus-selected bits through their output terminals C.

The output terminals C of the selector SL 1 deliver upper 4 bits (YK7-YK4) of the selected basic image YK in the form of signals YS3-YS0 to those terminals of the frame memories M15-M0 to which address values Y7-Y3 are assigned, through an exclusive OR group EORG 2. The horizontal/vertical changeover signal H/V is added to another input terminal of the exclusive OR group EORG 2. Therefore, the exclusive OR group EORG 2 serves as a buffer and the output logic of the selector SL 1 is not inverted but is instead added to the above-mentioned terminals of the frame memories M15-M0. The output terminals of the selector SL 2 deliver upper 4 bits (XK7-XK4) of the selected basic image XK to those terminals of the frame memories M15-M0 to which address values X3-X0 are assigned. On the other hand, lower 4 bits (YK3-YK0) on the Y coordinate (YK) of the basic image are applied through an exclusive OR group EORG 1 to those terminals of an address decoder ADDR to which decoding input values YA3-YA0 are added, and also to those terminals of a decoder DRR to which decoding input values YB3-YB0 are added. The horizontal/vertical changeover signal H/V is applied to another gate of the exclusive OR group EORG 1, while the lower 4 bits (YK3-YK0) at the address YK of the basic image are applied to the other gate thereof. When the horizontal/vertical changeover signal H/V is at a low level, therefore, the exclusive OR group EORG 1 serves as a non-inverting circuit or buffer.

Outputs of the above-mentioned exclusive OR group EORG 1 are added, as address values YA3-YA0, to the address decoder ADRR, while the horizontal/vertical changeover signal H/V is added to a terminal S thereof. Responsive to these signals, the address decoder ADRR outputs specific decoding values QF3-QF0, . . . , Q03-Q00 to the lower 4 bits of those terminals of the memories M15-M0 to which address values Y7-Y0 are respectively assigned.

FIG. 4A shows an input/output data table of the address decoder ADRR at the time the horizontal/vertical changeover signal is at a low level (or H/V=0) and FIG. 4B shows those at the time the horizontal/vertical changeover signal H/V is at a high level (or H/V=1). When the horizontal/vertical changeover signal H/V is at a low level, as described above, output data are determined as shown in FIG. 4A, and the address values Y3-Y0 or decoded outputs QF3-QF0, ..., Q03-Q00 which are added to the frame memories M15-M0 become the same as the decoding input values YA3-YA0, and the address values are added to the frame memories M15-M0.

When the above-mentioned values (block values BLK6-BLK0 and address values Y7-Y0 and X3-X0) are added to frame memories M15-M0, these frame memories M15-M0 output or input data D15-D0, corresponding to the values added. Further, read/write signal R/W is also added to the frame memories M15-M0; and when this read/write signal R/W is at a low level, the memories M15-M0 become ready for reading operation, while when the signal R/W is at a high level, the memories become ready for writing operation. More specifically, when signal R/W is at a low level, the memories transmit stored data, while when it is at a high level, they receive added data. Address values Y7-Y0 and X3-X0 means that an access of 16 bits is made in the horizontal direction in FIG. 2; and when reading is intended, for example, data which correspond to 16 bits are simultaneously read in the horizontal direction. In the case of the embodiment of the present invention shown in FIG. 2, 16 bits in the horizontal direction are always shifted in a row in a direction transversely by one bit, when the memory is viewed along the vertical direction. This shift is corrected by a bit shift circuit BSC to obtain a memory position in response to a dot position in the coordinates X and Y of the basic image added. The bit shift circuit BSC enables data DB15-DB0 to be obtained, corresponding to positions in coordinates X and Y.

The above-mentioned YK3-YK0 are applied to the decoder DRR through the exclusive OR group EORG 1. When vertical and horizontal changeover signal H/V is at a low level, exclusive OR logic group EORG 1 serves as a non-inversion circuit or buffer and the lower 4 bits (YK3-YK0) of the Y coordinate (YK) of the basic image are applied to decoder DRR. Decoder DRR decodes received values (address values) YB3-YB0. For example, when 4 bit address values YB3-YB0 are "0000", the output SD0 becomes "1", and the other outputs "0". In the case of "0001", output SD1 is "1" and the other outputs "0". Thus, only the outputs of decoder DRR which correspond to the received input value is made to be "1". On the other hand, a bit shift circuit BSC comprises 16 bit shift circuits BSC0-BSC15 and is formed so as to have an amount of shifting corresponding to the afore-mentioned decoded value. Namely, bit shift circuit BSC0 performs a shift of the 0 bit, thereby enabling input and output (data) D15-D0 to correspond to input and output (data) DB15-DB0 in a one-to-one fashion; and bit shift circuit BSC1 performs a shift of 1 bit, thereby enabling input and output (data) D0 to correspond to input and output (data) DB15, and enabling input and output (data) D15-D1 to correspond to input and output (data) DB14-DB0. Likewise, bit shift circuit BSC2-BSC15 performs a shift of 2-15 bits.

An output signal from bit shifting circuit BSC is assigned to a position corresponding to dot data of respective frame memories M15-M0; and bit shift circuits BSC0-BSC15 comprise 16 bi-directional buffers. The afore-mentioned amount of shift is determined by a circuit connection in the by-directional buffers and the direction of shift is controlled by the read/write signal R/W.

As described above, when a vertical and horizontal changeover signal H/V is at a low level ("0"), the data of the memory construction of FIG. 2 can be accessed by external means, as if each dot of data in the memory is arranged as shown in FIG. 5. The output of the memory may be accessed in units of 16 bits, where the lower 4 bits are represented by XK3-XK0; and the X coordinate XK of the fundamental image is not necessary, because the bits show data within a unit of 16 bits.

Next, we will explain a situation in which a vertical and horizontal changeover signal H/V is at the H-level. In this case, selectors SL 1 and SL 2 select data entered from an input terminal B to produce an output at an output terminal C. Namely, the higher four bits XK7-XK4 of the X-coordinate XK of the basic image produced are located at output terminal C of selector SL1. The output is applied to exclusive logic OR circuit EORG 2, and the H-level of vertical and horizontal changeover signal H/V is applied to one input of exclusive logic OR circuit EORG 2. Therefore, the upper four bit XK7-XK4 of X-coordinate XK of the basic image are delivered from the output terminal C, which is selected by selector SL 1, and these bits are inverted. This inversion operation makes address values Y7-Y4 of frame memories M15-M0 equal to values obtained by inverting the upper four bits XK7-XK4 of the X coordinate XK of the basic image.

For example, when an access is made rightward from the upper left end, e.g., an access to the basic image, the input changes sequentially in a manner of F, E, ... O; and F, E, ... O, ... O. On the other hand, the lower four bits YK3-YK0 of the Y coordinate YK of the basic image are applied to one input of the exclusive logic OR circuit EORG 1, the other input of which receives the vertical and horizontal changeover signal H/V. The exclusive logic OR group EORG 1 inverts the lower four bits YK3-YK0 of the Y coordinate YK, to thereby be applied to the address decoder ADRR and decoder DRR as the address values YB3-YB0. The address decoder ADRR switches the output data by the vertical and horizontal changeover signal H/V, thereby converting the address values YB3-YB0 as shown in FIG. 4B to deliver the decoded values QF3-QF0, ..., Q03-Q00 to the respective frame memories M15-M0. For example, when an access is made to the upper left end of the basic image, the lower four bits YK3-YK0 of the Y-coordinate YK of the basic image are inverted to "1111", thereby being applied to the address decoder when the address decoder ADRR which receives "1111" is applied to the respective frame memories M15-M0, the data "0000", "1111", "1110", "0111", "0110", "0101", "0100", "0011", and "0001" are delivered. The selector SL 2 selects the upper four bits YK-7-YK4 of the Y-coordinate YK of the basic memory which are applied to the frame memories M15-M0 as the dot values X3-X0. Thus, when access is made to the upper left end, the frame memories M15-M0 receive F00H and FF0H-F10H respectively. As these address values Y7-Y0 and X3-X0 are applied to the frame memories M15-M0 16 bit data, as counted from the left bottom end upward in FIG. 2, are transmitted from the respective frame memories M15-M0. The data comprises 16 bits, counted upwardly from the bottom left end of the basic image and an order of 16 bits is shifted. The order of these 16 bit data is corrected, by means of the bit shift circuit BSC, to have the data D14-D0 and D15 shown in FIG. 2. As described above, when the vertical and horizontal changeover signal H/V is applied at a high level, the lower four bits of the Y-coordinate YK of the basic memory are inverted by the exclusive logic OR group EORG 1, to be applied to the decoder DRR as the address values YB3-YB0. Thus, the output SD15 of the decoder DRR which is connected to the bit shift circuit BSC15 becomes high, so as to thereby apply an H level signal to an enable terminal E of the bit shift circuit BSC, and so as to operate the same. The input and output data D15 of the bit shift circuit BSC15 corresponds to the input and output DB0; and the input and output data D0-D14 corresponds to the input and output DB1-DB15. Therefore, the bit shift circuit BSC15 makes the input and output DB15-DB0 correspond to 16 bits, as sequentially counted upward from the bottom left end. When the upper four bits of the X coordinate XK of the basic image sequentially change, the frame memories M15-M0 are sequentially read out in a longitudinal direction in the same manner as described above, and the bit shift circuit BSC then performs a predetermined amount of bit shift. In the embodiment of the present invention shown in FIG. 3, the bit shift circuit BSC is a bi-directional buffer, and the direction of the buffer is changed by a read/write signal R/W. When the X and Y coordinate data of the basic image is applied, and the memory is accessed, the frame memories M15-M0 are in a read state during an L level of the read/write signal R/W, and are in a write state during a H level thereof. As the vertical and horizontal changeover signal H/V selects an access along a column or an access along a row a read/write operation is conducted at a normal position; namely, without m rotation of the image during the L level of the vertical and horizontal changeover signal H/V. The data obtained by turning the basic image 90° clockwise is produced in a read state during the H level of the vertical and horizontal changeover signal H/V. In a write state, the data obtained by turning the data written during the L level of the vertical and horizontal signal H/V to the left 90° anticlockwise is written in the frame memory.

As operated in the manner described above, the data obtained by turning the image data 90° clockwise can be read during the L level of the vertical and horizontal changeover signal H/V; and the data obtained by turning the image data 90° anticlockwise can be read during the H level of the vertical and horizontal changeover signal H/V. The 16 bits can be simultaneously obtained and processed by a single operation of the read or write, thereby increasing the access speed of the memory.

Figure 6:
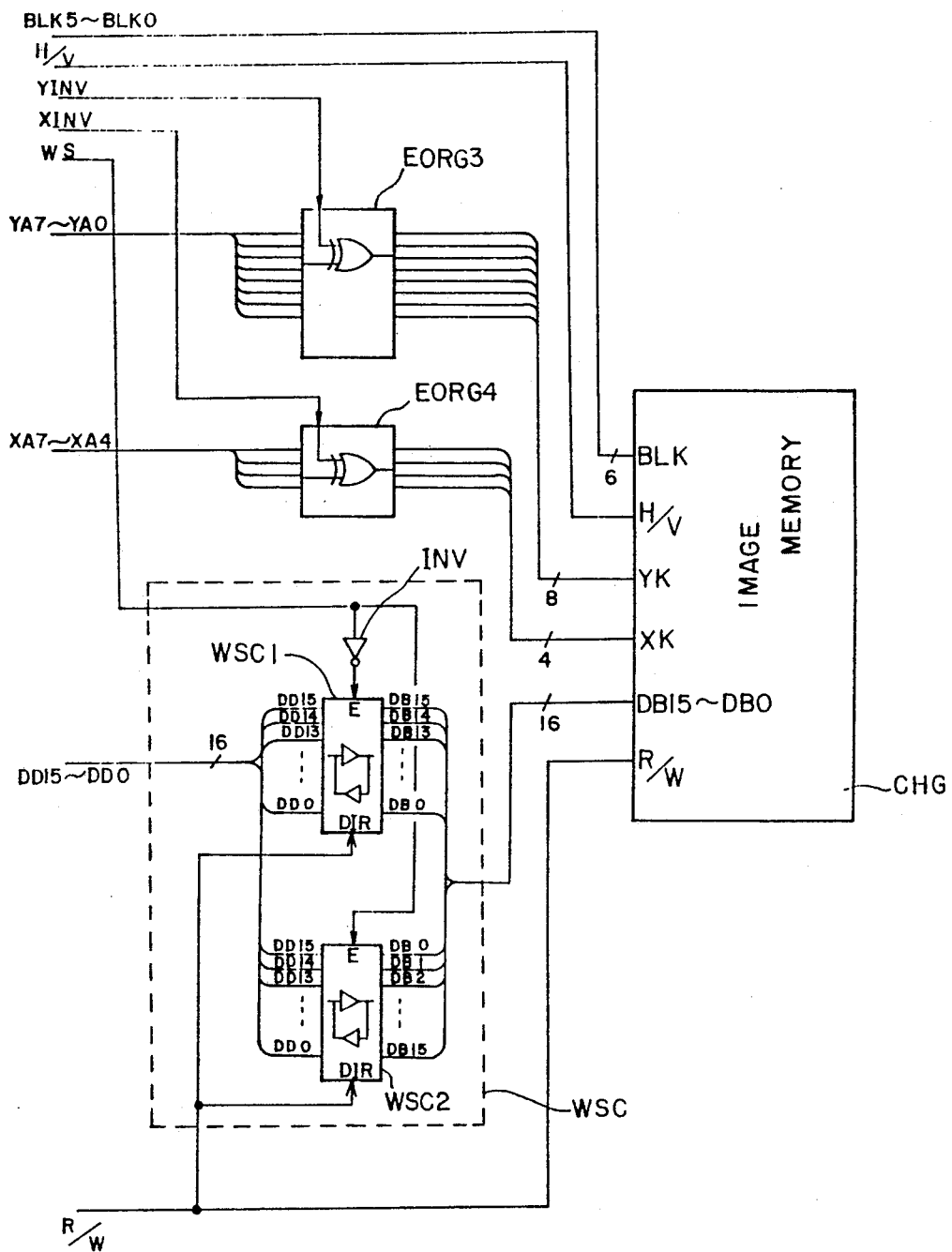
FIG. 6 is a circuit arrangement showing a second embodiment of the present invention.

FIG. 6 shows a circuit construction of the second embodiment of the present invention. An image memory CHG has a circuit construction as explained with respect to the memory of FIG. 3. The image memory CHG has the terminals for receiving the block values BLK5-BLK0, vertical and horizontal changeover signal H/V, address values Y7-Y0, X3-X0, and read/write signal R/W, as well as terminals for transmitting the data DB15-DB0 relating to the "read" period and for receiving data DB15-DB0 relating to the "write" period. The circuit shown in FIG. 3 makes it possible to only read the data obtained by turning the basic image to 90° clockwise and to write the data obtained by turning the basic image 90° anticlockwise. The circuit shown in FIG. 6 can read or write the data obtained by turning the basic image in steps of 90°, namely, 90°, 180° and 270° clockwise, or 270°, 180°, and 90° anticlockwise. As the image can be rotated by +90° in the circuit of FIG. 6, a desired rotation of the image and an image which is inverted from front to back can be obtained by reversing the address values of the image memory CHG and swapping the bits of the data, namely, replacing the MSB and other upper bits with the LSB and other lower bits.

The address is inverted by the exclusive logic OR circuits EORG 3 and EORG 4, and the bits of data are swapped by the data swapping circuit WSC.

An inverted control signal YINV is applied to an input of the exclusive logic OR circuit EORG 3, and the address values YA7-YA0 of the Y coordinate are applied to the other input thereof. When the inverted control signal YINV is "1", namely, at a H level, the address values YA7-YA0 are reversed, and thereafter applied to the image memory CHG as the address value YK. When the inversion control signal YINV is "0", namely, at a L level, the output is not inverted and the address values YA7-YA0 are applied to the image memory CHG as the address value YK.

One input of the exclusive logic OR group EORG 4 receives the inversion control signal XINV, and the other input thereof receives the address values XA7-XA4 of the X-coordinate. Only the upper four bits of the address values are necessary and the lower bits are not necessary because 16 bits are read in parallel. When the inversion control signal XINV is "1", the address values XA7-XA4 are reversed to be applied to the image memory CHG as the address value XK. When the inversion control signal XINV is "0", the output is not inverted and the address values XA7-XA4 are applied to the image memory CHG as the address value XK as they are found. The afore-mentioned exclusive logic OR groups EORG 3 and EORG 4 perform an inversion or a non-inversion of the address values YA7-YA0 and XA7-XA4, thereby adding them to the image memory CHG.

On the other hand, the data swap circuit WSC has two phase bi-directional buffers WSC 1 and WSC 2, each comprising 16 units. The bi-directional buffer group WSC 1 makes the input and output terminals DB15-DB0 of the image memory correspond to the data DD15-DD0. The bi-directional buffer groups WC2 make the input and output terminals DB0-DB15 of the image memory CHG correspond to the data DD15-DD0. The enable terminal E of the bi-directional buffer group WSC1 receives the data swap signal WS through the inverter INV, with the terminal E controlling operation of the buffer group WSC 1; and the bi-directional buffer group WSC 2 receives the data swap signal WS directly. Each bi-directional buffer group WSC 1 and WSC 2 operates when the enable terminal E thereof receives "1" (at the H level). When the data swap signal is "1", the input and output terminals DB0-DB15 is made corresponding to the data DD15-DD0 and the data is swapped between upper and lower bits. When the data swap signal is "0", the input and output terminals DB15-DB0 are made to correspond to the data DD15-DD0 in a one-by-one fashion. The bi-directional buffer groups WSC 1 and WSC 2 receive the read/write signal R/W. When read (i.e., 0) occurs, the data DB15-DB0 is made respective to the data DD15-DD0 or the data DD0-DD15, thereby producing the output. When write (i.e., 1) occurs, the data DD15-DD0 is made responsive to the data DB15-DB0 or the data DB0-DB15, thereby supplying the output to the image memory CHG.

FIG. 7 shows the image read out from the memory upon a read timing and written into the memory upon a write timing when the vertical and horizontal changeover signal H/V, the inversion control signals YINV and XINV, and the data swap signal respectively are determined.

In FIG. 7, a read period is shown which illustrates the positional status of the image read out from the memory, in which a normal basic image is written; and a write period is shown which illustrates the positional status of the image read out from the memory when all the signals VINV, XINV, WS AND H/V are "0".

Firstly, the situation when the vertical and horizontal changeover signal H/V=0 will be explained. When the inversion control signals YINV and XINV, and the data swap signal WS, are commonly "0", the normal basic image can be obtained during both of the read and write periods. In other words, the data which is not subject to rotation can be both read or written. When the inversion control signal YINV is "1", the address values YA–YA0 are turned around by the exclusive logic OR groups EORG 3, and a rear image of an inverted image can be obtained. When the basic image of a normal position is written, the up-side-down rear image is read out, and when the basic image is inputted, the up-side-down rear image can be written.

When the inversion control signal YINV is "0" and the inversion control signal XINV and data swap signal WS are "1", and the rear image (having its left and right sides swapped or reversed can be read and written. When the conversion control signals YINV and XINV and the data swap signal WS are "1", the X coordinates and Y coordinates are reversed with regard to the left and right sides and the upper and lower sides, and the data is swapped by the data swap signal, thereby enabling the basic image which is rotated by 180° to be read or written.

On the other hand, when the vertical and horizontal changeover signal H/V is "1", and when all of the other signals YINV, XINV and WS are "0", the image data rotated 90° clockwise can be read and the image data rotated to the 90° anticlockwise can be written. The vertical and horizontal changeover signal H/V is used to deliver or receive the data rotated 90° clockwise in response to the address values applied to the memory. When the signal H/V is "1", the inversion control signal YINV is "1", and the inversion control signal XINV and data swap signal WS are "0"; in this case, the image which is up-side-down, swapped (or received), and rotated 90° clockwise, can be read, and the image which is up-side-down, swapped (or received), and rotated 90° anticlockwise can be written. When the vertical and horizontal changeover signal H/V is "1", the inversion control signal YINV is "0", the inversion control signal XINV is "1" and the data swap signal is "1", the image data the left and right sides of which are reversed and turned to the rear and rotated 90° clockwise can be read, and the image data the left and right sides of which is reversed, turned rearwardly and rotated 90° anticlockwise can be written. When the vertical and horizontal changeover signal H/V, the reversion control signals YINV and XINV and the data swap signal WS are "1", the image data turned 270° clockwise can be read, and the image data turned 270° anticlockwise can be written.

By adding an intended value to the various signals, the front surface image or the rear surface image which is rotated by 0°, 90°, 180° and 270° can be obtained. In a column of an operation of FIG. 7, - means the other data than described above and most is obtained by swapping the data up and down or right and left in units of 16 bits.

The above mentioned embodiment relates to a circuit in which rotated data can be read or written in four directions on the front and rear image. It is rare to use the rear image when an actual image data is subject to a rotation and in most cases, a rotation process is conducted relative to the front image.

Figure 8A:
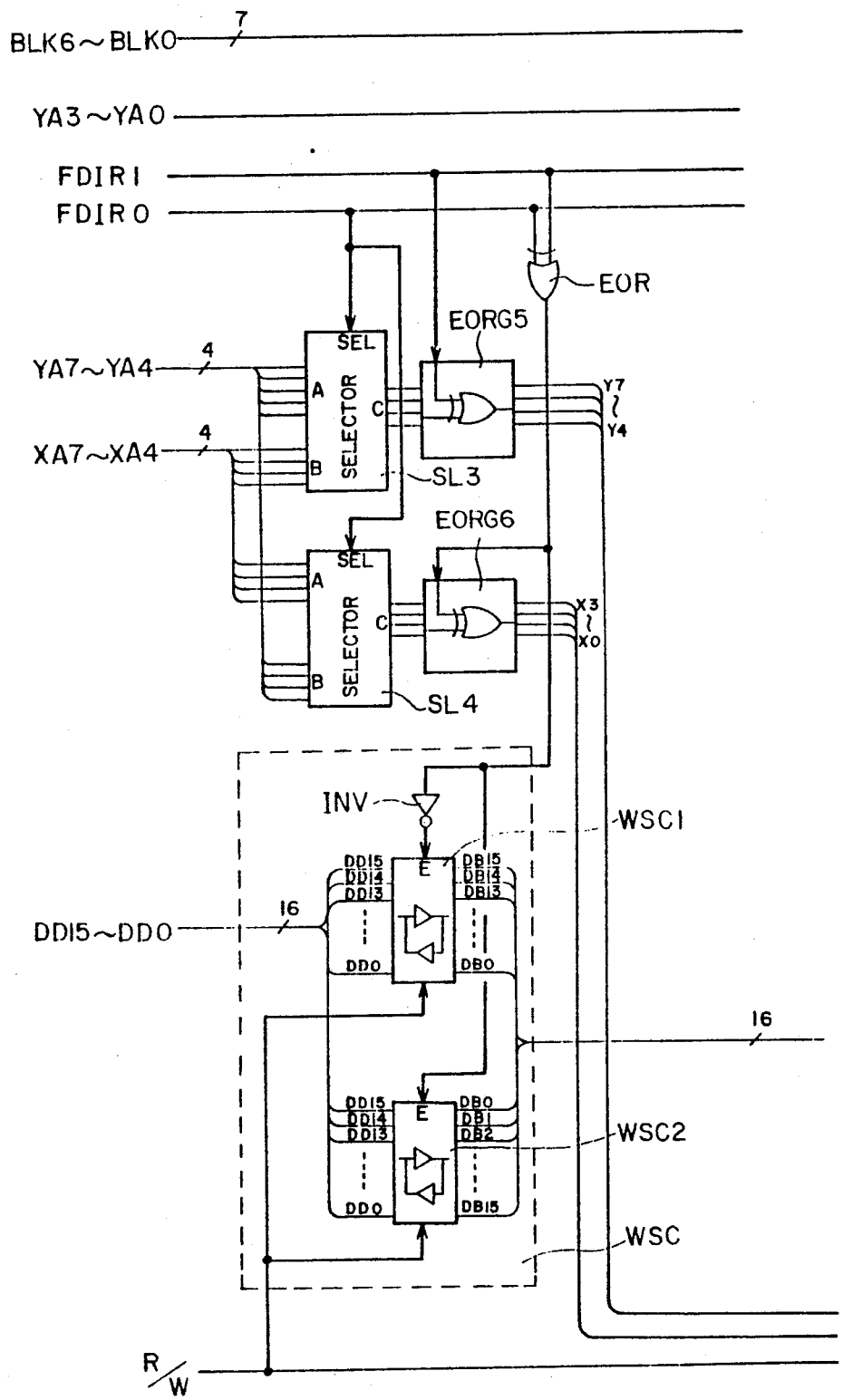
FIGS. 8A and 8B are a circuit arrangement showing a third embodiment of the present invention.

FIGS. 8A and 8B show a rotation structure of a third embodiment of the present invention. The rotation image of the front image in four directions, (namely, 0°, 90°, 180°, 270°) can be read or written.

In a circuit diagram of the embodiment of the present invention, the exclusive logic OR groups, EORG 2 is provided at the input of the image memory VHG. The data is inverted by the exclusive logic OR groups EORG 3 and EORG 4 and the data is further inverted and returned to its original position. These logic circuits are simplified and are made so as not to produce the rear image, thereby providing the rotation structure of the third embodiment.

The circuit of the same function as the first and second embodiments, shown in FIGS. 3 and 6, will be referred to the same reference numbers as in the first and second embodiments and will be explained again hereinafter.

The rotation control signals FDIR0 and FDIR1 are read out by rotating the basic image by 90°, 180° and 270° anticlockwise during a read period and written by rotating the basic image by 90°, 180° and 270° clockwise during a write period.

The rotation control signal FDIR0 is applied to the selecting terminal SEL of the selectors SL 3 and SL 4. The address values YA7 to YA4, and XA7 to XA4 are added to the input terminals A and B of the selector SL 3 and the address values XA7 to XA4 and YA7 to YA4 are applied to the input terminals A and B. Therefore, when the rotation control signal FDIR0 is "0", the selector SL 3 selects the address values YA to YA4 applied to the input terminal A and the selection SL4 selects the address values YA7 to YA4 applied to the input terminal A, with the respective outputs of the selectors SL 3 and SL 4 applied to one of the inputs of the exclusive logic OR groups EORG 5 and EORG 6. As the other input of the exclusive logic OR groups EORG 5 receives the rotation control signal FDIR 1, the output of the selector SL3 is not inverted during "0" of the rotation control signal FDIR1 and the output of the selection SL 3 is inverted during "1" of the rotation control signal FDIR 1, thereby enabling the frame memories M15 to M0 to receive the output of the selector SL 3 as their respective address values YA 7 to YA4. The input of the exclusive logic OR circuit EOR receives the aforementioned rotation control signals FDIR 0 and FDIR1.

Figure 8:
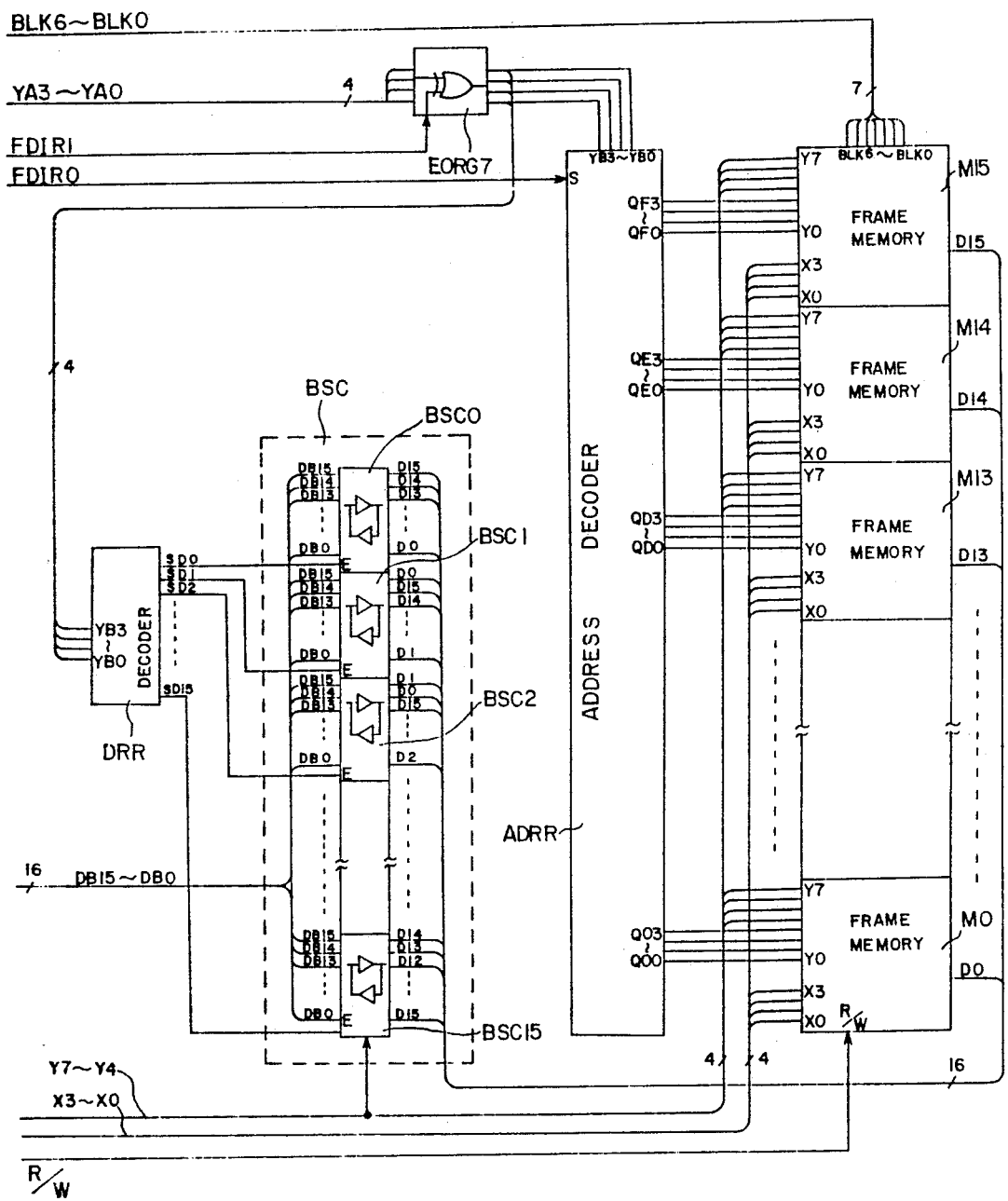
Figure 10A:
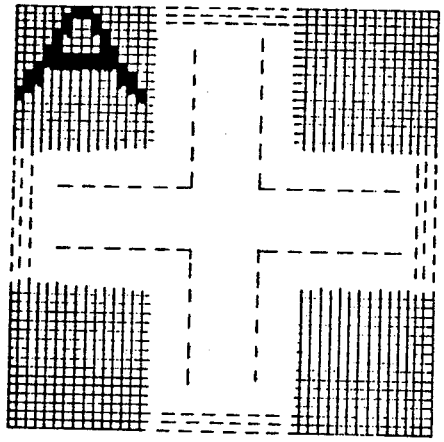
FIG. 10A shows image data relating to an unrotated image.
Figure 10B:
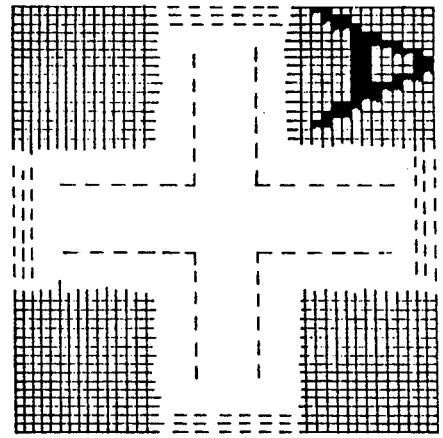
FIG. 10B illustrates image data relating to the image rotated by 90° clockwise.
Figure 10D:
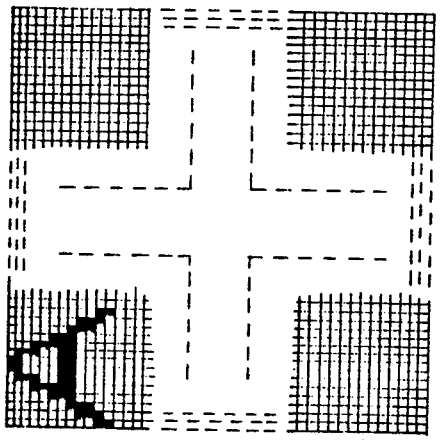
FIG. 10D illustrates image data relating to the image turned clockwise 270°.
Figure 10C:
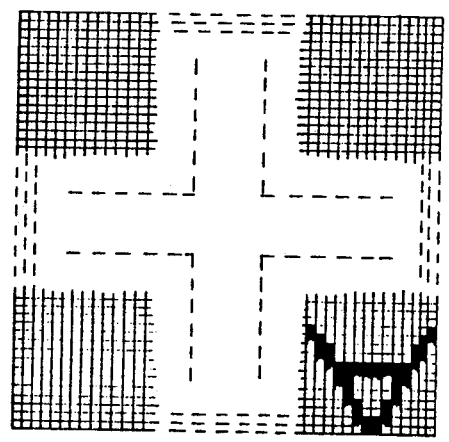
FIG. 10C illustrates image data relating to the image turned clockwise 180°.

The output of the selector SL 4 is transmitted to one of the inputs of the exclusive logic OR groups EORG 6. The other input of the exclusive logic OR circuit EORG 6 receives the output of exclusive logic OR circuit EOR. Thus, when the rotation control signals FDIR0 and FDIR1 are respectively "1" and "0", or "0" and "1", the selected signal is inverted and when they are the same (that is, at the same logic), for example, "0" and "0", or "1" and "1", the selected signal is not inverted, thereby enabling the frame memories M15 to M0 to receive the rotation control signals. FIG. 8 shows a relation between the rotation control signals FDIR1 and FDIR0 and the address values Y7 to Y4 and X3 to X0. When the rotation control signals FDIR1 and FDIR0 are "0" and "0", the frame memories M15 to M0 receive the input address values YA7-YA4 as the address values Y7-Y4 and the input address values YA-7-YA4 as the address values X3-X0. When the roation control signals FDIR1 and FDIR0 are "0" and "1" respectively, the frame memories M15-M0 receive the address values YA7-YA4 as the address values Y7-Y4 and the inverted values (which are shown by "-" on the references in FIG. 9 of the address values YA7-YA4 as the address value Y7-Y4. when the rotation control signals FDIR1 and FDIR0 are "1" and "0". The address values Y7-Y4 are the inverted values of the address values YA7-YA4, and the address values X3-X0 are the inverted values of the address values YA7-YA4. When the rotation control signals FDIR 1 and FDIR0 are "1" and "1", the address values Y7-Y4 are the inverted values of the address values YA7-YA4 and the address values X3-X0 are the address values YA-7-YA4.

On the other hand, the rotation control signal FDIR 1 is applied to one of the inputs of the exclusive logic OR groups EORG7. As the address values YA3 to YA0 are applied to the other input of the exclusive logic OR group EORG7, the output thereof is not inverted when the rotation control signal FDID1 is "0", and is inverted when it is "1", thereby being supplied to the address decoder ADRR and decoder DRR as the respective address values YB3-YB0.

The connector between the address decoder ADRR and the frame memories M15-M0, between the decoder and bit shift circuit BSC and between the frame memories M15-M0 and the bit shift circuit BSC are the same as shown in FIG. 3. The terminals of the address decoder receive the rotation control signal FDIR0 which selects the decoded data shown in FIG. 4A and 4B.

The bit shift circuit BSC is connected to the data swapping circuit WSC. The output of the exclusive logic OR and circuit EOR determines whether both circuits are connected on a one bit by one bit basis or the LSB is replaced by the MSB, namely both circuit are connected to each other by swapping with each other in units of each position. The read/write signal R/W is added to a direction control terminal of the data swap circuits WSC 1 and WSC2, or direction control terminal of the bit shift circuit BSC0-BSC15 and read/write terminal of the frame memories M15-M0. When the read/write signal R/W is "1", the data swap circuit WSC1 and WSC2 and the bit shift circuit BSC0-BSC15 determines their directions so as to transmit the data to the frame memories M15-M0, which finally receive the data. Conversely, when the read/write signal R/W is "0" the frame memories M15-M0 deliver the data stored therein and the data swap circuit WSC1 and WSC2 determine their directions so as to transmit the data from the frame memories M15-M0 to an external apparatus.

The case where both the rotation control signals FDIR1 and FDIR0 are "0", is the same as that where all the inversion control signals, YINV and XINV, data swap signal WS and vertical and horizontal changeover signal H/V are "0". Namely, the address values Y7-Y0 of the frame memories M15-M0 become the address values YA7-YA0 and the address value X3-X0 becomes the address values XA-XA4. The input and output data D15-D0 of the frame memories M15-M0 are shifted in one word units (16 bits) by an amount of the address values YA3-YA0 through the bit shift circuit BSC so as to correspond to the input and output data DB15-DB0 of the external apparatus. The output ("0") of the exclusive logic OR circuit EOR is inverted by the inverter INV to "1". It is thereby added to the data swap circuit SWSC1 V, thus making the input and output DB0-DB15 correspond to the input and output DD0-DD15, one by one. Thus, they become the same access memory as the basic memory arrangement shown in FIG. 2.

When the rotation control signals FDIR1 and FDIR0 are respectively "0" and "1", the address values Y7-Y4 become the address values HA7-HA4 and the address values X3-X0 become YA7-YA4. The address M15-M0 are the inversions of the address values YA-7-YA4 and the address values YA7-YA4 applied thereto are the inversions of the address values YA-7-YA4. The address values YA7-YA4 of the Y coordinate and the address values XA7-XA4 of the X coordinate are inverted and then, applied to the frame memories. At this time, the S terminal of the address decoder ADRR receives "0" and the address decoder also receives the address values YA3-YA0 after they are inverted by the exclusive logic OR group EORG7. Thus, the access to the memory starts from the lower right position and extends along a transverse single line. As the inverted data is applied to the decoder DRR, it is also shifted by a specified amount of shift, when the data is read along a horizontal single line from the lower right position, i.e. the basic image is read in the reverse direction. When the data is read in an inverted sequence, the 16 bits forming one word are in the order of the basic image. Thus, "1" is applied to the terminal E of the data swap circuit WSC2, enabling the positions of MSB and LSB of the bits to the reversed. Therefore, it becomes possible to read the data in units of 16 bits in a transverse direction, beginning with the lower decoder receiving the non-inverted address values YA3 to YA0 through the exclusive logic OR group EOR1 and then adding them to the frame memories after they are subject to the address decode shown in FIG. 4B. Thus, the frame memories M15-M0 are accessed and the access starts from the upper right position and advances by vertical single lines consecutively. In this instance, the terminal E of the data swap circuit WSC2 receives the output ("1") of the exclusive logic OR circuit EOR and, thus, the input and output data DD15-DD0 correspond to the bit shift circuit BSC. As explained before, the 16 bits of the vertical single line are read out and the bit positions comprise one word in such a manner that they extend from the bottom to the top. Thus, the up and down relating of the bit positions is inverted by the data swap circuit WS2. By means of this operation, the memories are accessed by turning clockwise by 90° when the rotation control signals FDIR1 and FDIR0 are respectively "0" and "1". The data turned anticlockwise by 90°, is read during a read operation, turned clockwise by 90° and written.

When the rotation control signals FDIR1 and FDIR 0 are "1" and "0", respectively, the address values Y7-Y4 applied to the frame memories' right position, and to invert the bit positions of MSB and LSB, thereby providing a read or write operation by rotating the basic image clockwise or anticlockwise.

When both the rotation control signals FDIR1 and FDIR0 are "1", the address values Y7-Y4 applied to frame memories M15-M0 are the inversions of the address values XA7-XA4 and the address values X3-X0 are the address values YA-YA4. As "1" is also applied to the exclusive logic OR group EORG7, the address values YA3-YA0 are inverted and then, applied to the address decoder ADDR and decoder DRR. As "1" is also applied to the terminal S of the address decoder ADRR, different address values are added to the lower addresses Y3-Y0 of the respective frame memories M15-M0, thereby making access to a single vertical line of the memory, beginning with the lower left position. This access is the same as the case where the basic image is read from the lower left end in an upward direction. The bit shift circuit BSC sequentially changes the amount of shift during a read operation by the inverted address values YA3-YA0. Then, "1" is applied to terminal E of the data swap circuit WSC1 and thus, the data at input and output terminals DB15-DB0 of the bit shift circuit BSC corresponds to the data at input and output terminals DD15-DD0 of an external apparatus. Therefore, a read or write operation is performed consecutively in a vertical direction in units of 16 bits, beginning with the lower left position, i.e., a read operation subject to an anticlockwise rotation of 270° and a write operation subject to a clockwise rotation of 90°.

FIGS. 10A-10D are a display example of a rotation image obtained by a read or write operation of the memory of the embodiment according to the present invention, when a write operation is conducted by making the rotation control signals FDIR1 and FDIR0, "0" and "0" (FIG. 10A), "0" and "1" (FIG. 10B), "1" and "0" (FIG. 10C), or "1" and "1" (FIG. 10D), as shown in the table of FIG. 8, and the read operation is conducted by making both the rotation control signals FDIR1 and FDIR0 "0", then, the image data which is rotated clockwise by 0°, 90°, 180° and 270° can be obtained as shown in FIGS. 10A-10D. The rotation of the image is done not only during a write operation but may also be performed during a read operation, i.e. when the rotation control signals FDIR1 and FDIR0 are changed during the read operation, the rotation of the image data can be similarly obtained. During the read operation, the image data which is rotated anticlockwise by 90°, 180° and 270° opposite to the write operation, can be obtained. When the rotation control signals FDIR1 and FDIR0 are not "0" and "0" during an application of the basic image, their values correspond to a memory location of the basic image. This is also applied to the aforementioned embodiments of FIGS. 3 and 6.

A memory construction of (n×n) dots and a driving circuit thereof are explained above by referring to the embodiments. In the following, we will explain a driving circuit for a plurality of image memories comprising the above-described memories and their driving circuits, to which access is made in a vertical or transverse direction, clockwise or anticlockwise, upward or downward.

Figure 11:
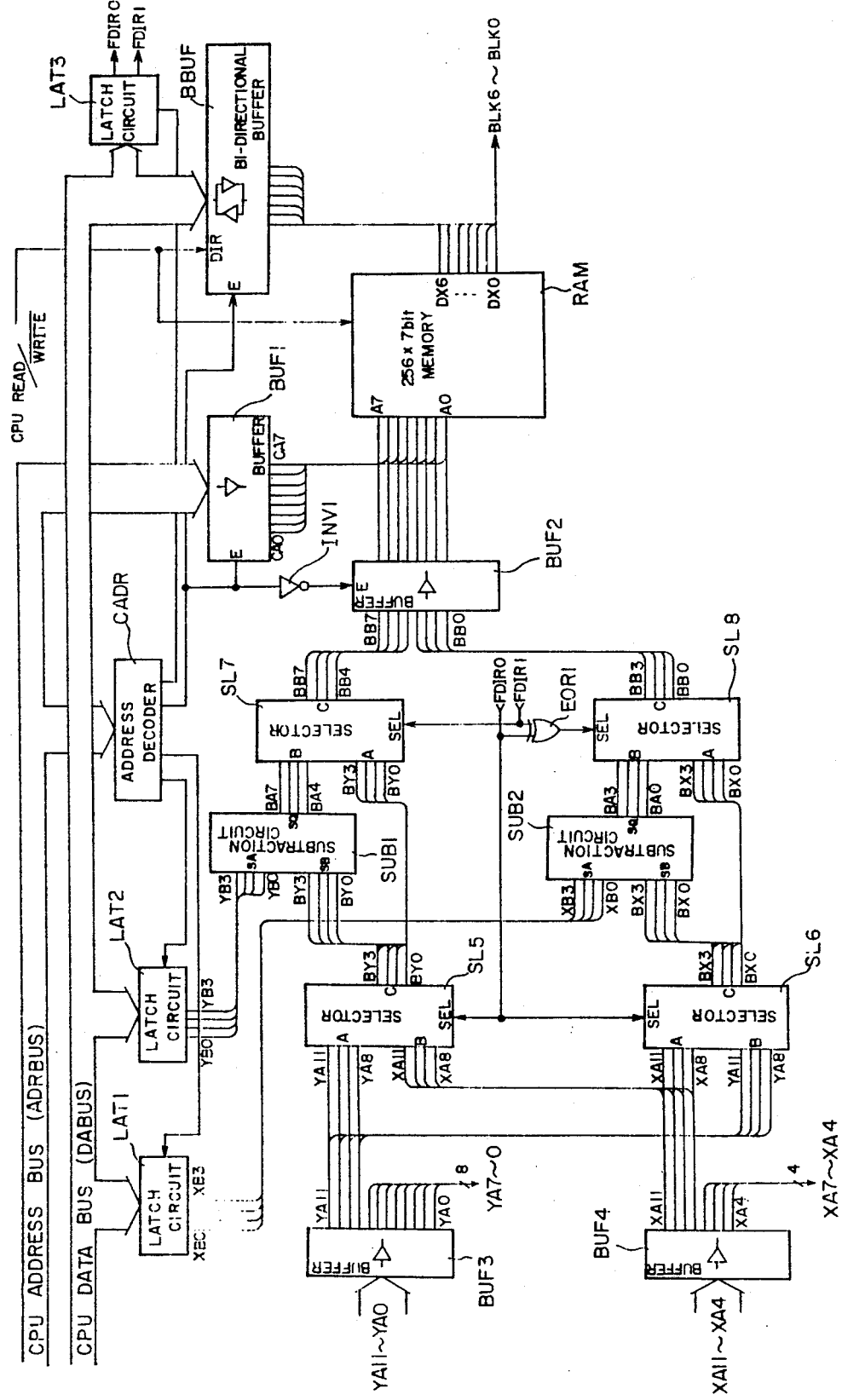
FIG. 11 is a circuit arrangement of a fourth embodiment of the present invention.

FIG. 11 is a circuit diagram of the fourth embodiment of the present invention. The circuit shown in FIG. 11 shows a driving circuit for the memories of the third embodiment of the present invention.

An address bus ADRBUS of a microprocessor CPU are connected to an address decoder CADR and buffer BUF1. A data bus DABUS of the microprocessor CPU is connected to latch circuits LAT1 and LAT3 and bidirectional buffer BBUF. The microprocessor CPU performs a program stored in a memory not shown and processes image data to write them in the aforementioned memories. In order to achieve a data writing a display function through the process, the necessary data is written in the aforementioned latch circuits LAT1-LAT3 and the address values YA11-YA0 and XA1-XA4 which are supplied from an address generating circuit used for access to frame memories not shown, are controlled. A writing to the latch circuits LAT1-LTA3 is conducted by receiving an address signal from the microprocesser CPU via an address bus ADRBUS, decoding the address signal by means of the address decoder CADR, and applying a receipt timing signal to the latch circuits LAT1-LAT3 upon receiving a particular address value assigned to the respective latch circuits LAT1 to LAT3, thereby enabling them to receive the data from the data bus DABUS. The latch circuit LAT3 stores the rotation control signals FDIR0 and FDIR1 and delivers them to the terminals shown in FIGS. 8 and 11.

On the other hand, a buffer BUF1 is connected to the address bus ADRBUS and a bidirectional buffer BBUF is connected to the data bus DABUS. When a particular address value is supplied from the address bus ADRBUS to the address decoder CADR, the address decoder CADR applies an enable signal E to the buffers BUF1 and bidirectional buffer BBUF, thereby enabling the address values on the address bus ADRBUS to be applied to the terminals of the memory RAM for receiving the address values A7-A0 and enabling the data on the data bus DABUS to be applied to the terminals of the memory RAM for receiving and delivering the input and output data values DX6-DX0. The memory RAM comprises 7×256 bits and stores assignment data for determining an arrangement of a memory of 256×256 dots. The stored data is selected by the values applied from the buffer BUF2 and then, added to the image memory as block values BLK6-BLK0.

Supposing that an image of size B4 comprises 2304×3334 dots, and image memories having 9 blocks transversely and 14 blocks vertically. FIG. 12 shows an example of the block members which are assigned when the image of size B4 is displayed. 9 blocks such as 0H-8H, 9H-11H and 75H-7DH in a transverse direction and 14 blocks in a vertical direction are assigned and in total 126 blocks are provided. Blocks 7E and 7F are residuals. Data in 9 blocks are read by accessing 0H, 1H, . . . 8H consecutively with regard to 256 lines, and then, all the images are read out by accessing blocks 9H-11H, . . . 75H-7DH with regard to the respective 256 lines.

By this operation, the memory storing the image of size B4, for example, can be accessed and the image can be read after it is rotated by 90°, 180° and 270°. This operation of the present embodiment will be explained hereinafter.

126 images in total are accessed by delivering the respective block values BLK 6-BLK0 from the memory RAM as described above and this is based on the data previously written in a memory RAM. i.e. and address can be sequentially supplied from the buffer BUF2, for example, and block values BLK6-BLK0 stored are applied to the image memory corresponding thereto.

However, when it is rotated by 90°, 180° or 270°, the order is different depending on whether the direction of rotation is clockwise or anticlockwise in the tranverse direction, or whether movement is up or down in the vertical direction. This is controlled by the rotation control signals FDIR0 and FDIR1 which determine the operation of the selectors SL5-SL8 and subtraction circuits SUB1 and SUB2.

Buffers BUF3 and BUF4 receive vertical direction addresses YA11-YA0 and transverse direction addresses XA11-XA4 when the size B4 is made corresponding to a single image. As the data can be in units of 16 bits in parallel in a transverse direction, transverse direction addresses XA3-XA0 are not applied thereto. Addresses YA11-YA8 in a vertical direction are applied to an A terminal of the selector SL5 and B terminal of the selector SL6 through the buffer BUF3. The addresses XA11-XA8 in a transverse direction are applied to an A terminal of the selector SL6 and a B terminal of the selector SL5 through the buffer BUF4. The selectors SL5 and SL6 deliver the signals which are added to terminal A or B from the output terminal in accordance with a signal level applied to the selector terminal SEL. When "0" is applied to the selector terminal SEL, the signal added to the terminal A is selected and when "1" is applied to the selector terminal SEL, the signal added to the terminal B is selected When the signal FDIR0 is "0", the selectors SEL 5 and SEL6 respectively select the vertical direction addresses YA11-YA8 and transverse direction addresses XA11-XA8 which are applied to terminal A. The outputs of the selections SL5 and SEL6 are applied respectively to subtraction inputs SB of subtraction circuits SUB1 and SUB2 and to terminal A of selectors SL7 and SL8. Data YB0-YB3 and XB0-XB3 latched in latch circuits LAT2 and LAT1 are applied respectively to an input SA of subtraction circuits SUB 1 and SUB2, and a subtraction output SQ of the subtraction circuit SUB1 and SUB2 is connected to terminal B of selectors SL7 and SL8.

Selectors SL5 and SL6 select either vertical direction addresses YA11-YA8 or transverse direction addresses XA11-XA8 and deliver them as addresses BY3-BY0 and BX3-BX0.

On the other hand, the selection outputs BY3-BY0 and BX3-BX0 of the selectors SL5 and SL6 select the results BA7-BA4 and BA3-BA0 of the selector circuit. The rotation control signal FPIR1 is applied to the selection terminal SEL of the selector SL7. Thus, when the rotation control signal FDIR1 is "0", the outputs BY3-BY0 of the selector SL5 are selected, and when the rotation control signal FPOR1 is "1", the outputs BA7-BA4 of the subtraction circuit SUB1 are selected.

The selection terminal SEL of the selector SL8 is connected to the output of the exclusive logic OR circuit EOR1 to which the rotation control signals FDIR0 and FDIR1 are applied. Therefore, when the rotation control signals FDIR0 and FDIR1 are either both "0" or both "1", the selector SL8 selects the output of the selector SL6, and when rotation control signal FDIR0 or FDIR1 is "0" and the other is "1", the selector SL8 selects the output BA3-BA0 of the subtraction circuit SUB2. The decode signal of the address decoder CADR is supplied to the enable terminal E of the buffer BUF2 through the inverter INV1. Thus, when a processor accesses a memory through the buffer BUF2, the decoded value becomes "1", thereby making the buffer BUF2 and the bi-directional buffer BBUF operate and enabling a read/write of the memory. The read/write signal read/write of the processor is applied to the bi-directional buffer BBUF and memory RAM and during a read operation, the bi-directional BBUF delivers the data from the memory to the data bus DABUS and during a write operation, the bi-directional buffer BUFF delivers the data of the data bus DABUS to the memory RAM, which receives the data.

When the other address values are applied to the address bus ADRBUS to access the other circuits, latch circuits LAT1-LAT3 and the other circuits and shown in the drawing, the address decoder CADR delivers "0" to the afore-mentioned buffer BUF1 and the bi-directional buffer BBUF, thereby stopping the operation of these buffers. As the output of the address decoders CADR is applied to the enable terminal of the buffer BUF2 through the inverter INV1, "0" is inverted to "1" by the inverter INV1 and, then, is applied to the enable terminal E of the buffer BUF2, thereby operating the buffer BUF2, i.e., in this situation, the signal selected by the selectors SL7 and SL8 is applied to those terminals of the memory to which the address values are applied.

FIG. 13 is a table showing the rotation control signals FDIR0 and FDIR1 and the address values which are applied to the memory.

When both the rotation control signals FDIR1 and FDIR0 and "0", the upper 4 bits YA11-XA8 of the transverse address are applied to the upper and lower addresses of the memory RAM, respectively. As the lower 8 bits YA7-YA0 of the vertical address and the lower 4 bits XA7-XA4 of the transverse address are applied to the image memory, the normal position (namely, the unrotated position) of the image data is accessed. As a rotation of the image is controlled by rotation control signals FDIR0 and FDIR1, as shown in the circuit of FIGS. 8A and 8B, the normal position of the image is obtained.

When the rotation control signal FDIR1 is "0", and the rotation control signal is "1", the value obtained by subtracting vertical addresses YA11-YA8 from vertical addresses XA11-XA8 and the values XB3-XB0 stored in latch LAT1 are applied to the upper and lower addresses of the memory RAM, respectively. The maximum number of the block values (namely, the maximum number of the blocks forming a single transverse row of the normal image position) are stored in the latch circuit LAT1. The upper 4 bits of the address of the memory RAM are the vertical address of the normal image position and the lower 4 bit addresses of the memory RAM are the transverse addresses of the normal image position. Thus, the transverse direction addresses XA11-XA8 are used for access in the vertical direction of the normal image and the transverse direction addresses YA11-YA8 are used for access in the transverse and inverted directions (namely, from the right to the left). The upper right end of the normal image is considered as the basic point.

When the rotation control signal FDIR1 is "1" and the rotation control signal FDIR0 is "0", selection terminal SEL of selectors SL7 and SL8 receives "1" and the selection SL7 and SL8 select the result of the subtraction circuits SUB1 and SUB2. The maximum block value of the other line (namely, the maximum block value constituting a vertical line of the normal image position) is stored in the latch circuit LAT2. The address values of the memory RAM are (YB3-YB0)-(YA11-YA8) and (XB3-XB0)-(XA11-XA8). These values correspond to the case where access is made to the normal position image subject to a rotation of 180°.

When the rotation control signals FDIR1 and FDIR0 are both "1", the selector SL7 selects the output of the subtraction circuit SUB1 and the selector SL8 further selects the selection result of the selector SL6, and the address values of the memory RAM are (YB3-YB0)-(XA11-XA8) and YA11-YA8, i.e. a read operation is conducted by considering the lower left end of the normal positional coordinate as the basic point. The address values A7–A0 are supplied to the RAM and the respective blocks which were previously made corresponding to the data are selected and, then, a read or write operation is carried out.

As the image memory is accessed by a clockwise rotation of 90°, 180° or 270°, the respective blocks are also accessed through a clockwise rotation of 90°, 180° or 270°, which is conducted relative to the respective blocks. The upper 4 bits of the transverse direction addresses XA11–XA4 and the upper 4 bits of the vertical addresses YA11–YA0 are assigned to the block address. The vertical addresses XA3–XA0 are not neccessary as the memory is accessed in units of 16 bits. If the maximum block value obtained after the respective rotation is stored in the latch circuits LAT1 and LAT2, the normal image is rotated by 90°, 180° or 270° to provide the image data.

Although not shown in the drawing, a read or write operation to the frame memory is possible by access to the memory in units of the block shown in FIG. 11. During the write operation, a write is conducted by rotating the basic image by 90°, 180° or 270° in a clockwise direction and during a read operation, a read is conducted by a rotation of 90°, 180° or 270° relative to the read direction of the image memory. As the normal image can be a regular square, the maximum address value at the read or write operation is different.

As described above, the memory arrangement and the circuit for driving the memory are described above by referring to the embodiment of the present invention, and the present invention is not limited to the memory arrangement of FIG. 2. The shift of the present invention may be carried out in units of three bits with regard to the respective rows, may be arranged in units of odd numbers or may be arranged in a manner of random numbers.

The memories can be divided in vertical and transverse directions in units of 16 bits. The arrangement may be made in such a manner of random numbers that the data is read out in a vertical or horizontal direction within the area of 16 by 16 dots, with the same bit eliminated from the reading.

In this case the address decoder ADRR and the decoder DRR should be arranged in a similar manner to decode the addresses in the manner of random numbers.

In the above embodiment of the present invention the addresses in the transverse and vertical directions are selected by the selector to be applied to the memory but are not limited to this case. For example, the transverse and vertical direction addresses are applied to the address decoder and the value of the address decoder may be selected by the vertical and horizontal direction change-over signal H/V.

In the embodiment of the present invention, the subtraction circuit is utilized to detect the addresses when the access is made in an inverted direction but is not limited to this case. The memory itself may be able to perform the same address conversion. Further, the memory RAM is not limited to a read and write type but can also be composed of the read only type. It is also possible to make the address values A7–A0 correspond to the block value directly on a one to one basis.

As described above in detail, the present invention provides a memory circuit in which plurality of data dots of the image data of $n \times n$ dots are shifted in a transverse direction of a row or a longitudinal direction of a column to be stored in the memory. According to the present invention, when the memory is accessed in a transverse direction as well as in a vertical direction, the intended plurality of data dots are likewise stored or read out.

In the present invention, access is made to the memory or image data comprising a plurality of memory sections or memories. Further, the present invention provides a dynamic memory driving circuit for rotating the image in a simple circuit when image data of $n \times n$ dots are stored in a single memory or a plurality of memories.

What is claimed is:

1. A memory control circuit of an image memory, which is a two dimensional memory addressed by one-word unit in an X direction and by one-bit unit in a Y direction, for reading/writing one word data comprising m bits from/to a memory region designated by a single address at a time, said circuit comprising:
   a) x address designating means (XA4–XA11) for designating said X direction address;
   b) y address designating means (YA0–YA11) for designating said Y direction address;
   c) conversion designating means (H/V) for designating an existence or nonexistence of a rotating conversion of the data read to or written from said image memory;
   d) word address converting means (SL1, SL2, EORG2) being inputted by both one-word unit addresses designated by said X address designating means and Y address designating means, for outputting them "as is" or by exchanging their addresses, as one-word unit internal address of said memory;
   e) m memory sections ($M_0$–$M_{15}$), each being an aggregate of the memory cells at the same bit position in the word section of said image memory, and respectfully having a one-bit data input/output line;
   f) bit address converting means (EORG1, ADRR) for applying Y direction addresses (YK0–YK3) in one-bit units designated by said Y address designating means to said M memory sections ($M_0$–$M_{15}$) commonly "as is", or by converting them to different values for each memory section, as the internal addresses in one-bit units of said memory;
   g) barrel-shift means (BSC, DRR), including means for connecting m data input/output lines of said memory sections with the data buses for transmitting data in one-word units, for circularly shifting the connecting points between said data input/output lines and data buses by the number corresponding to one-bit unit addresses designated by said Y address designating means.

2. A memory control circuit according to claim 1 wherein a direction in which data are shifted by said shift circuit means, upon reading/writing data to/from said m memory sections, is opposite to that in which the data are shifted by said shift circuit means upon writing/reading data from/to said m memory sections.

3. A memory control circuit according to claim 1 further comprising data swaping means (WSC) for reversing a sequence of one-word data read-out from said image memory such that the sequence from the most significant bit MSB to the leased significant bit LSB is converted to that from LSB to MSB.

4. A memory control circuit according to claim 1 wherein:

a) said image memory comprises an aggregate of memory blocks of p words in the X direction by q bits in the Y direction (where $q = m \times p$, and $p \geq 2$); and b) block selecting signals (BLK0-6) for designating the memory block to be accessed selected from said memory blocks are commonly inputted to each said memory section.

5. The memory control circuit according to claim 1 further comprising:

a) an X range memory means (LAT1) for memorizing the maximum X direction range memorizable by said image memory as the values of said memory block unit;

b) a Y range memory means (LAT2) for memorizing the maximum Y direction range memorizable by said image memory as the value of said memory block unit;

c) an active region designating means (BUF1) of said image memory for designating the width of the X and Y directions of the image data inputting and outputting said image memory as a number of said block units; and d) a block address generating means for converting said X direction addresses, designated by said X address designating means, and said Y direction address designated by said Y address designating means, to said block selecting signals according to the designating information of the values of said X and Y range memorizing means, the value of said active region designating means and said conversion designating means.

6. The memory control circuit according to claim 5 wherein:

a) said block address generating means has a layout memory (RAM) for defining a layout of said memory block necessary for memorizing the image data inputted to or outputted from the image memory, based on the designation of said image region designating means, each said layout memory having a region for memorizing a memory block identification code for identifying said memory block in one memory unit access by a designation of said address designation, and an address terminal for designating a two-dimensional address;

b) writing means (BUF1, BUF2) for sequentially writing said memory block identification codes into each said region in the address range designated by said active region designating means;

c) reading means (A0-A7, DX0-DX6) for reading out said memory block identification codes stored in said region accessed according to the address designation inputted to said address terminal as said block selecting signal;

d) first selecting means for outputting the inputted one memory block unit addresses contained in said X direction and Y direction addresses either "as is" or by exchanging both addresses, according to the designation by said designating means; and e) second selecting means for outputting the inputted outputs from said first selecting means, to the address terminal of said layout memory, either "as is" or by subtracting each of the inputs from memory values of said X range memory means and said Y range memory means, according to the designation of said conversion designating means.

* * * * *